(12) United States Patent
Stacy et al.

(10) Patent No.: US 10,290,221 B2
(45) Date of Patent: May 14, 2019

(54) SYSTEMS AND METHODS TO CUSTOMIZE STUDENT INSTRUCTION

(71) Applicants: E. Webb Stacy, Andover, MA (US); Courtney Dean, Arlington, MA (US); Alan Carlin, Arlington, MA (US); Danielle Dumond, Haverhill, MA (US)

(72) Inventors: E. Webb Stacy, Andover, MA (US); Courtney Dean, Arlington, MA (US); Alan Carlin, Arlington, MA (US); Danielle Dumond, Haverhill, MA (US)

(73) Assignee: Aptima, Inc., Woburn, MA (US)

( * ) Notice: Subject to any disclaimer, the term of this patent is extended or adjusted under 35 U.S.C. 154(b) by 1628 days.

(21) Appl. No.: 13/872,519

(22) Filed: Apr. 29, 2013

(65) Prior Publication Data

US 2013/0288222 A1   Oct. 31, 2013

Related U.S. Application Data

(60) Provisional application No. 61/639,565, filed on Apr. 27, 2012.

(51) Int. Cl.
    *G09B 7/00*    (2006.01)
    *G09B 5/00*    (2006.01)
    *G06N 99/00*   (2019.01)

(52) U.S. Cl.
    CPC ............... *G09B 5/00* (2013.01); *G09B 7/00* (2013.01); *G06N 99/005* (2013.01)

(58) Field of Classification Search
    CPC .................................... G09B 5/00; G09B 7/00
    See application file for complete search history.

(56) References Cited

U.S. PATENT DOCUMENTS

| 6,212,510 B1 * | 4/2001 | Brand ............... G06K 9/00342 706/12 |
| 8,467,599 B2 * | 6/2013 | El Dokor ........... G06K 9/00221 382/156 |

(Continued)

FOREIGN PATENT DOCUMENTS

| JP | 2007/328507 | 12/2007 |
| WO | 2010/038156 | 4/2010 |

OTHER PUBLICATIONS

Gonzales-Brenes, Jose P. and Mostow, Jack. Dynamic Cognitive Tracing: Towards Unified Discovery of Student and Cognitive Models. International Educational Data Mining Society, Paper presented at the International Conference on Educational Data Mining (EDM) (5th, Chania, Greece, Jun. 19-21, 2012). Project LISTEN—Carnegie Mellon University.

(Continued)

*Primary Examiner* — Robert J Utama
(74) *Attorney, Agent, or Firm* — John J Brooks, III

(57) ABSTRACT

A computer implemented systems and methods for determining an action for a user within a learning domain are disclosed, some embodiments of the methods comprise defining an initial learning model of a learning domain, determining an initial user state of the user, determining an initial user action from at least one learning domain action with the initial learning model, receiving a user observation of the user after the user executes the initial user action, determining an updated user state with the initial learning model given the updated user observation and determining a subsequent user action from the at least one learning domain action. Some embodiments utilize a Partially Observable Markov Model (POMDP) as the learning model.

21 Claims, 18 Drawing Sheets

(56) References Cited

U.S. PATENT DOCUMENTS

| | | | |
|---|---|---|---|
| 8,655,822 | B2 | 2/2014 | Levchuk et al. |
| 2002/0046202 | A1 | 4/2002 | Honda |
| 2002/0064766 | A1 | 5/2002 | Cozens et al. |
| 2002/0133391 | A1 | 9/2002 | Johnson |
| 2004/0015386 | A1 | 1/2004 | Abe et al. |
| 2004/0117624 | A1* | 6/2004 | Brandt ............... H04L 63/1408 713/166 |
| 2006/0184471 | A1* | 8/2006 | Minamino ............ G10L 15/144 706/16 |
| 2006/0200333 | A1 | 9/2006 | Dalal et al. |
| 2006/0224535 | A1 | 10/2006 | Chickering |
| 2006/0248026 | A1* | 11/2006 | Aoyama ............. G05D 1/0221 706/12 |
| 2008/0260212 | A1* | 10/2008 | Moskal ................ A61B 5/1079 382/118 |
| 2010/0010943 | A1* | 1/2010 | Ito .......................... G06N 3/08 706/12 |
| 2010/0010948 | A1* | 1/2010 | Ito .......................... G06N 3/08 706/20 |
| 2011/0016067 | A1 | 1/2011 | Levchuk et al. |
| 2011/0214006 | A1* | 9/2011 | Meek ................. G06F 11/0709 714/2 |
| 2012/0076416 | A1* | 3/2012 | Castellanos ............ G06Q 10/10 382/190 |
| 2012/0254333 | A1* | 10/2012 | Chandramouli ........ G06F 17/27 709/206 |
| 2013/0288222 | A1 | 10/2013 | Stacy et al. |
| 2015/0317589 | A1* | 11/2015 | Anderson .............. G06Q 10/08 705/7.25 |

OTHER PUBLICATIONS

Chi, Min; Koedinger, Kenneth; Gordon, Geoff; Jordan, Pamela and Vanlehn, Kurt. Instructional Factors Analysis: A Cognitive Model for Multiple Instructional Interventions. Proceedings of the 4th International Conference on Educational Data Mining. Eindhoven, the Netherlands. 2011.

Cassandra, A. (1998). A survey of POMDPS applications. American Association for Artificial Intelligence Symposium, Austin Texas, USA. 9 pgs.

Elliott, L.R., Cardenas, R., and Schiflett, S.G., 1999, Measurement of AWACS team performance in distributed mission scenarios. Available online at: http://www.dodccrp.org/1999ccrts/pdf_files/track_3/013ellio.pdf (accessed Aug. 28, 2003), Texas, USA. 18 pgs.

Ericsson, K.A., 2002, Attaining excellence through deliberate practice: Insights from the study of expert performance. In the Pursuit of Excellence Through Education, M. Ferrari (Ed.), (Mahwah, NJ: Lawrence Erlbaum Associates, 2002), New Jersey, USA. 20 pgs.

Ericsson, K.A., 2004, Deliberate practice and the acquisition and maintenance of expert performance in medicine and related domains. Academic Medicine, 79, pp. S70-S81, USA. 20 pgs.

Ericsson, K.A., Krampe, R. TH., and Tesch-Romer, C., 1993, The role of deliberate practice in the acquisition of expert performance. Psychological Review, 700, p. 379 and p. 384., USA. 44 pgs.

Fahey, R.P., Rowe, A.L., Dunlap, K.L., and Deboom, D.O., 2000, Synthetic task design (1): Preliminary cognitive task analysis of AWACS weapons director teams. Technical Report. Brooks AFB, TX: Armstrong Laboratory, 59 pgs.

Levchuk, G.M., Gildea, K., Freeman, J., Shebilski, W., Alakke, G. and Narakesari, S., Abstract for CCRTS2007, Title: Benchmarked Experiential System for Training (BEST), presented Jun. 19-21, 2007 in Newport RI, 6 pgs.

Shebilski, W., Gildea, K., Freeman, J. and Levchuk, G., Abstract for HFES2007 Conference, Title: Training Experienced Teams for New Experiences, presented at conference Oct. 1-5, 2007 in Baltimore MD, 5 pgs.

Baharlou, Simin, PCT International Preliminary Report on Patentability, PCT/US2009/036865 filed Mar. 11, 2009, dated Sep. 14, 2010, Switzerland. 5 pgs.

Kim, Sang Cheol, PCT International Search Report, PCT/US2009/036865 filed Mar. 11, 2009, dated Nov. 6, 2009, Korea. 3 pgs.

Daniel Pellett, Office Action Detail for U.S. Appl. No. 12/921,755, filed Sep. 9, 2010, dated Apr. 2, 2013, USA. 22 pgs.

R. Nair, D. Pynadath, M. Yokoo, M. Tambe, and S. Marsella, "Taming decentralized POMDPs: Towards efficient policy computation for multiagent settings," in Proceedings of the Eighteenth International Joint Conference on Artificial Intelligence (IJCAI-03), 2003, Mexico. 7 pgs.

N. Schurr, J. Marecki, J.P. Lewis, M. Tambe, and P. Scerri. The DEFACTO system: Training tool for incident commanders. In IAAI'05, 2005, USA. 8 pgs.

J. Yen, J. Yin, T. Loerger, M. Miller, D. Xu, and R. Volz. Cast: Collaborative agents for simulating teamwork. In Proceedings of International Joint Conference on Artificial Intelligence, 2001, USA. 8 pgs.

Jaakkola, T., Singh, S. P., Jordan, M. I. (1995) Reinforcement learning algorithms for partially observable Markov decision problems, Cambridge, MA, USA. 8 pgs.

X. Fan, J. Yen, "Modeling and simulating human teamwork behaviours using intelligent agents," in Physics of Life Reviews 1 (2004), pp. 173-201, University Park, PA, USA. 29 pgs.

Daniel Pellett, Notice of Allowance for U.S. Appl. No. 12/921,755, filed Sep. 9, 2010, dated Aug. 26, 2013, 19 pgs., USPTO.

Daniel Pellett, Office Action Detail for U.S. Appl. No. 14/143,410, filed Dec. 30, 2013, dated Apr. 19, 2016, 29 pgs., USPTO.

Anker, T., D. Dolev, and B. Hod "Belief Propagation in Wireless Sensor Networks—A Practical Approach", Proceedings of the 3rd International Conference on Wireless Algorithms, Systems, and Applications, Oct. 26-28, 2008, pp. 466-479, 5258, Springer Berlin Heidelberg, Dallas Texas, USA, 14 pgs.

Crick, C., A. Pfeffer "Loopy Belief Propagation as a Basis for Communication in Sensor Networks", UAI'03 Proceedings of the Nineteenth conference on Uncertainty in Artificial Intelligence, Aug. 7, 2002, pp. 159-166, Morgan Kaufmann Publishers Inc. San Francisco, CA, USA, 8 pgs.

Elidan, G., I. McGraw, and D. Koller "Residual belief propagation: Informed Scheduling for Asynchronous Message Passing", Proceedings of the Twenty-second Conference on Uncertainty in AI (UAI), 2006, pp. 165-173, AUAI Press, Boston, MA, USA, 9 pg.

Haupt, J., W. U. Bajwa, M. Rabbat, and R. Nowak "Compressed Sensing for Networked Data", IEEE Signal Processing Magazine, Mar. 2008, pp. 92-101, vol. 25, IEEE, New York, NY, USA, 10 pgs.

Malewicz, G., M. Austern, A. Bik, J. Dehnert, I. Horn, N. Leiser, and G. Czajkowski "Pregel: a system for large-scale graph processing", Proceedings of the 2010 ACM SIGMOD International Conference on Management of data, Jun. 6-11 2010, pp. 135-146, ACM, New York, NY, USA, 11 pgs.

Pfeffer, A., T. Tai "Asynchronous Dynamic Bayesian Networks", Proceedings of the Twenty-First Conference on Uncertainty in Artificial Intelligence, Jul. 26-29, 2005, pp. 467-476, AUAI Press, Arlington, VA, USA, 10 pgs.

Sutton, C., and A. McCallum "Improved Dynamic Schedules for Belief Propagation", Proceedings of the Twenty-third Conference on Uncertainty in Artificial Intelligence (UAI), Jul. 19-22, 2007, pp. 376-383, AUAI Press, Boston, MA, USA, 8 pgs.

Brocheler, M., A. Pugliese, V. P. Bucci, and V. S. Subrahmanian "COSI: Cloud oriented subgraph identification in massive social networks", International Conference on Advances in Social Networks Analysis and Mining, Aug. 9-11, 2010, pp. 248-255, IEEE, New York, NY, USA, 8 pgs.

Bertsekas, D., R. Gallager "Data Networks", 2nd edition, 1992, pp. 432-447. 1Prentice-Hall Inc., Upper Saddle River, New Jersey, USA, 8 pgs.

Misiaszek, Amber A., Office Action Detail for U.S. Appl. No. 14/207,684, filed Mar. 13, 2014, dated Jan. 5, 2017, USPTO. 19 pgs.

Daniel Pellett, Office Action Detail for U.S. Appl. No. 14/143,410, filed Dec. 30, 2013, dated May 19, 2017, 15 pgs., USPTO.

Misiaszek, Amber A., Office Action Detail for U.S. Appl. No. 14/207,684, filed Mar. 13, 2014, dated Aug. 8, 2017, USPTO. 24 pgs.

(56) References Cited

OTHER PUBLICATIONS

Misiaszek, Amber A., Advisory Action Detail for U.S. Appl. No. 14/207,684, filed Mar. 13, 2014, dated Oct. 13, 2017, USPTO. 4 pgs.

Misiaszek, Amber A., Office Action Detail for U.S. Appl. No. 14/207,684, filed Mar. 13, 2014, dated Dec. 21, 2017, USPTO. 15 pgs.

Daniel Pellett, Advisory Action Detail for U.S. Appl. No. 14/143,410, filed Dec. 30, 2013, dated Aug. 22, 2017, 5 pgs., USPTO.

Daniel Pellett, Advisory Action Detail for U.S. Appl. No. 14/143,410, filed Dec. 30, 2013, dated Oct. 19, 2017, 19 pgs., USPTO.

Daniel Pellett, Office Action Detail for U.S. Appl. No. 14/143,410, filed Dec. 30, 2013, dated Mar. 12, 2018, 26 pgs., USPTO.

Freeman, J., Stacy, W., Olivares, O., Assessment for Learning and Development in Virtual Environments. Schmorrow, D., Cohn, J., & Nicholson, D. (Eds.), The PSI handbook of virtual environments for training and education: Developments for the military and beyond. Westport, CT: Praeger Security International, 2009, 28 Pgs.

Pellett, Daniel, Advisory Action Detail for U.S. Appl. No. 14/143,410, filed Dec. 30, 2013, dated Jun. 12, 2018, 6 pgs., USPTO.

Misiaszek, Amber A., Office Action Detail for U.S. Appl. No. 14/207,684, filed Mar. 13, 2014, dated Aug. 9, 2018, USPTO. 19 pgs.

Hall, Shauna-Kay., Office Action Detail for U.S. Appl. No. 15/395,574, filed Dec. 30, 2016, dated Aug. 8, 2018, USPTO. 14 pgs.

\* cited by examiner

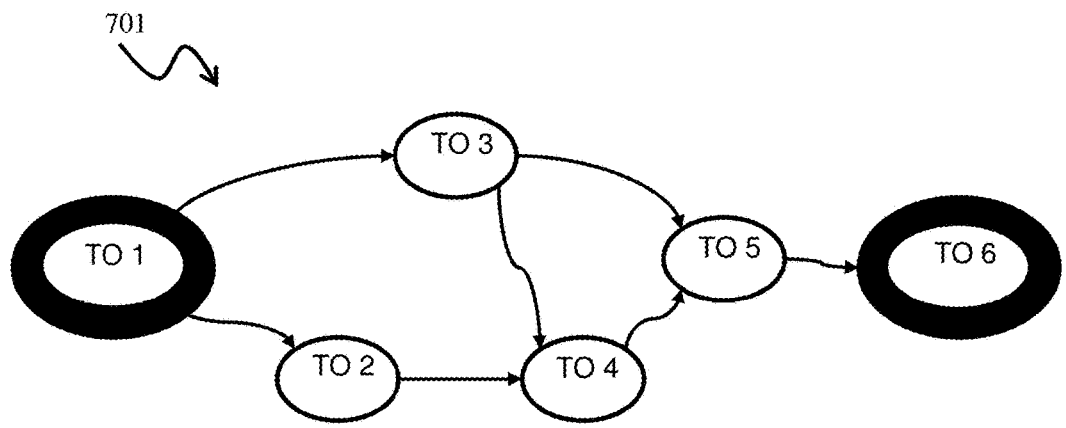
(a)
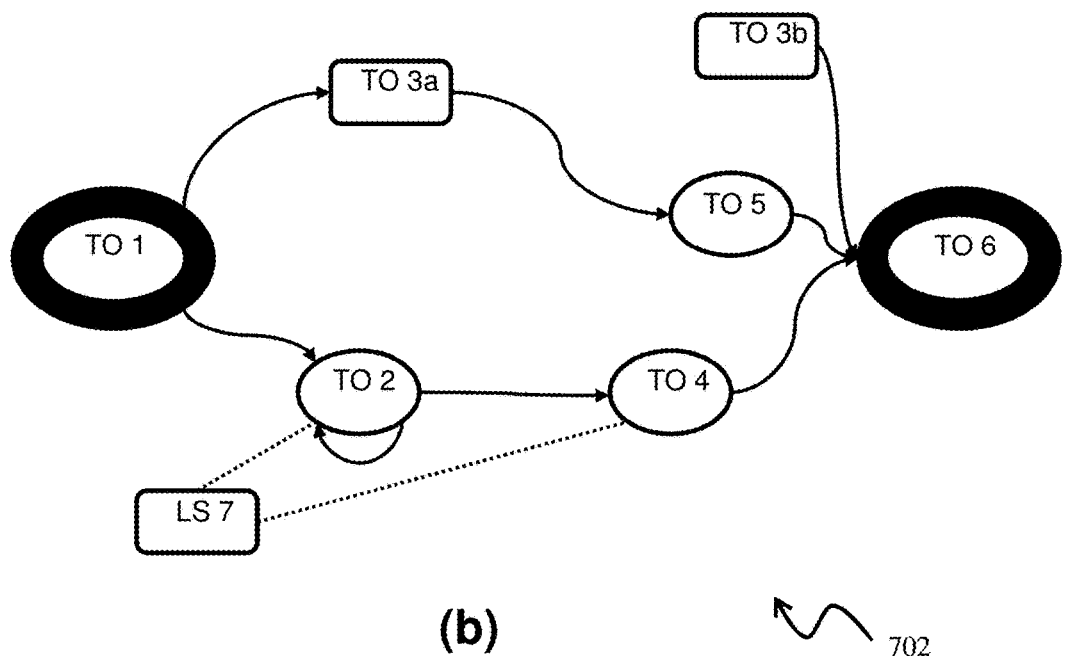
(b)
FIG. 7

Transition table For a student given ELM:

| State Before\State After | Novice | Intermediate | Advanced | Expert |
|---|---|---|---|---|
| Novice | 40% | 60% | 0% | 0% |
| Intermediate | 0% | 80% | 20% | 0% |
| Advanced | 0% | 0% | 100% | 0% |
| Expert | 0% | 0% | 0% | 100% |

FIG. 12A

Transition table For student given DLM:

| State Before\State After | Novice | Intermediate | Advanced | Expert |
|---|---|---|---|---|
| Novice | 100% | 0% | 0% | 0% |
| Intermediate | 0% | 10% | 90% | 0% |
| Advanced | 0% | 0% | 50% | 50% |
| Expert | 0% | 0% | 0% | 100% |

FIG. 12B

Observation Table:

| Quiz Score\Actual Ability | Novice | Intermediate | Advanced | Expert |
|---|---|---|---|---|
| A | 0% | 33% | 33% | 34% |
| B | 0% | 33% | 50% | 17% |
| C | 40% | 40% | 20% | 0% |
| F | 90% | 10% | 0% | 0% |

Easy item
Easy item
Easy item
Moderately difficult item
Moderately difficult item
Moderately difficult item
Moderately difficult item
Very difficult item
Very difficult item
Very difficult item

FIG. 13A

Item (actually easy)
Item (actually moderately difficult)
Item (actually easy)
Item (actually moderately difficult)
Item (actually moderately difficult)
Item (actually very difficult)
Item (actually moderately difficult)
Item (actually very difficult)
Item (actually easy)
Item (actually very difficult)

| Item (actually easy) | ☑ |
| Item (actually moderately difficult) | ☑ |
| Item (actually easy) | ☑ |
| Item (actually moderately difficult) | ☑ |
| Item (actually moderately difficult) | |
| Item (actually very difficult) | ☑ |
| Item (actually moderately difficult) | ☑ |
| Item (actually very difficult) | |
| Item (actually easy) | |
| Item (actually very difficult) | ☑ |

FIG. 14

SYSTEMS AND METHODS TO CUSTOMIZE STUDENT INSTRUCTION

CROSS-REFERENCE TO RELATED APPLICATIONS

This application claims the benefit of U.S. App. No. 61/639,565, filed on Apr. 27, 2012, entitled "SYSTEM, METHOD AND PROCESS FOR AUTOMATICALLY CREATING A MODEL OF LEARNING A DOMAIN," the entire contents of which are incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

1. Field of the Invention

The present invention relates to the field of automated decision making, in particular to automatically determining instructional content to be presented to individual students.

2. Description of the Prior Art

To date, the preparation of effective training materials for students has been a manual, labor-intense process. It typically starts with manual task analysis or knowledge elicitation sessions, and these require a fair amount of time from both training professionals and subject matter experts (SMEs). The materials developed from those sessions are then manually transformed into a set of knowledge, skills, and abilities (KSAs) and training objectives (TOs) and instructional content, lectures, scenarios, simulations, etc., are subsequently developed for each. In the best of cases, one or more performance metrics manually developed for each TO, and an interpretation for those metrics and assessments—is also manually developed. Even though the training content, metrics, and assessments differ between didactic and experiential training environments, the development process is quite similar and equally labor intensive.

This approach requires extensive time and effort to execute, it also imposes unfortunate limits on the resulting training material. Because the process is labor intensive, training objectives are rarely tailored to individual needs; and performance metrics and assessments seldom do more than simply identify when or where students struggle. They almost never provide the individualized diagnostic power that would make for optimum training.

There is also increasing evidence suggesting that individualized training, in the form of tailored content, metrics, and assessments, can yield considerably more powerful results. One of the conventional ways of adapting training to the needs of individual trainees, using Intelligent Tutoring Systems (ITS), requires building individual models of how each individual trainee learns the required KSAs and then applying that model to the training regimen. To date, this has been successfully accomplished only with extensive effort.

Instructional design is entering a period of transformation, one in which this intellect-driven process becomes increasingly data-driven with some data-driven aids for instructional design being considered to overcome some of the above challenges. Research concerning such aids is growing (cf., the International Educational Data Mining Society) as data sources arise from intelligent tutoring systems (cf., the PSLC DataShop), serious games and simulations, and internet courses.

BRIEF SUMMARY OF THE INVENTION

The following summary is included only to introduce some concepts discussed in the Detailed Description below. This summary is not comprehensive and is not intended to delineate the scope of protectable subject matter, which is set forth by the claims presented at the end.

Example embodiments of the systems and methods disclosed provide a convenient approach to tailoring computer-delivered instruction to individual students. Some embodiments allow instructional designers to use existing data based on student performance to automatically build a model of the state of a students' knowledge during the course, and to use the model to automatically select the best instructional material to present to each student, given their current state of knowledge. This results in computer-based instruction that provides, tailored to each individual student, the best instructional path through the lesson and the course. In some embodiments, the disclosed systems and methods may be utilized to tailor computer-delivered instruction to students in Massively Open Online Courses (MOOCs).

In one embodiment of the invention, a computer implemented method for determining an action for a user within a learning domain is provided, the method comprising defining an initial learning model of a learning domain, determining an initial user state of the user, determining an initial user action from at least one learning domain action with the initial learning model given an initial user state as at least one learning domain state, receiving a user observation of the user after the user executes the initial user action and determining an updated user state with the initial learning model given the updated user observation. In some embodiments, the method further comprises determining a subsequent user action from the at least one learning domain action. In some embodiments, the initial learning model comprises a plurality of learning domain states, at least one learning domain action, at least one domain learning domain state transition, and at least one learning domain observation.

In some embodiments, a learning model system for determining an action for a user within a learning domain is provided comprising a computer system including one or multiple processors configured to perform the method for determining an action for a user within a learning domain.

In some embodiments, the initial system model comprises a Partially Observable Markov Decision Process (POMDP) and the at least one domain learning domain state transition comprises a learning domain state transition probability table of $P(s'|s, a)$ where s is the initial state, s' is the updated user state and a is the at least one learning domain action.

In some embodiments, the computer implemented method further comprises automatically determining the learning domain state transition probability table utilizing a Hidden Markov Model (HMM) function where an input to the HMM function comprises a probability that the initial user state will change to the updated user state, a probability that the learning domain observation is obtained while the state of user is the updated user state and a probability of the initial state of the user. In some embodiments, the HMM function comprises a state transition probability distribution, a conditional observation probability distribution, and a probability of the initial state of the user whereby the state transition probability distribution defines the at least one domain learning domain state transition for the POMDP given the at least one learning domain observation defined by the conditional observation probability distribution for the initial state of the user defined by the probability of the initial state of the user.

In some embodiments, the computer implemented method further comprises defining the at least one learning domain state, the at least one learning domain action and the at least one learning domain observation from a learning domain ontology. In some embodiments, defining an initial learning model of a learning domain further comprises automatically determining the learning domain ontology from a learning domain data set comprising a plurality of learning domain problems and a plurality of learning domain observations. In some embodiments, automatically determining the learning domain ontology from a learning domain data set further comprises utilizing a Principal Component Analysis (PCA) algorithm whereby the input is the plurality of learning domain problems and the plurality of learning domain observations and the output is at least one of the plurality of learning domain states. In some embodiments, the initial system model comprises a Partially Observable Markov Decision Process (POMDP) and the at least one of the plurality of learning domain states defines the plurality of learning domain states for the POMDP.

In some embodiments, the at least one learning domain state comprises a competency measure and defining the initial learning model of a learning domain further comprises automatically determining the competency measure. In some embodiments, defining the initial learning model of a learning domain further comprises automatically determining the competency measure utilizing an Item Response Theory (IRT) algorithm comprising a conditional probability of getting the at least one item correct given a latent proficiency score of the user and a difficulty level of the at least one item. In some embodiments, the initial system model comprises a Partially Observable Markov Decision Process (POMDP) and the conditional probability of getting the at least one item correct given a latent proficiency score of the user and a difficulty level of the at least one item defines the at least one learning domain observation for the POMDP.

In some embodiments, a computer program product for a learning model system is provided comprising a non-transitory computer readable storage medium having a computer readable program code embodied therein, said computer readable program code configured to be executed to implement the methods for determining an action for a user within a learning domain.

Scientists have been trying to automatically create learning models used by Intelligent Tutoring Systems with little success. As described herein, combining 1) a PCA and HMM-based method to define a knowledge ontology that integrates as learned domain knowledge with 2) an IRT-based method for estimating and scoring item difficulty uniquely combines mathematical approaches typically used in different domains such as knowledge elicitation and high-stakes personnel selection.

The systems and methods disclosed recognize opportunities to automate the development of training and assessment materials. Data-driven instructional design aids might utilize data to recommend to the designer: the instructional topics that are most distinct to students, and thus may be the most accessible partitioning of the domain; the minimal set of measures required to assess student knowledge and skill on the instructional topics; and the sequences of instruction that most efficiently support learning by students.

BRIEF DESCRIPTION OF THE SEVERAL VIEWS OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 7 illustrates two Models of Learning the Domain (MLDs or learning models) where model (a) is constructed from the domain ontology and (b) is enhanced by machine learning using actual student data;

FIG. 12A illustrates one example embodiment of a transition table;

FIG. 12B illustrates one example embodiment of a transition table;

FIG. 12C illustrates one example embodiment of an observation table;

FIG. 13A illustrates scoring on a conventional, CTT-based measure, in which the score is a simple count of correct responses;

FIG. 13B illustrates an IRT-based presentation of the measure;

FIG. 14 illustrates a second illustrative scoring of CTT-based measure;

DETAILED DESCRIPTION OF THE INVENTION

Figure 1:
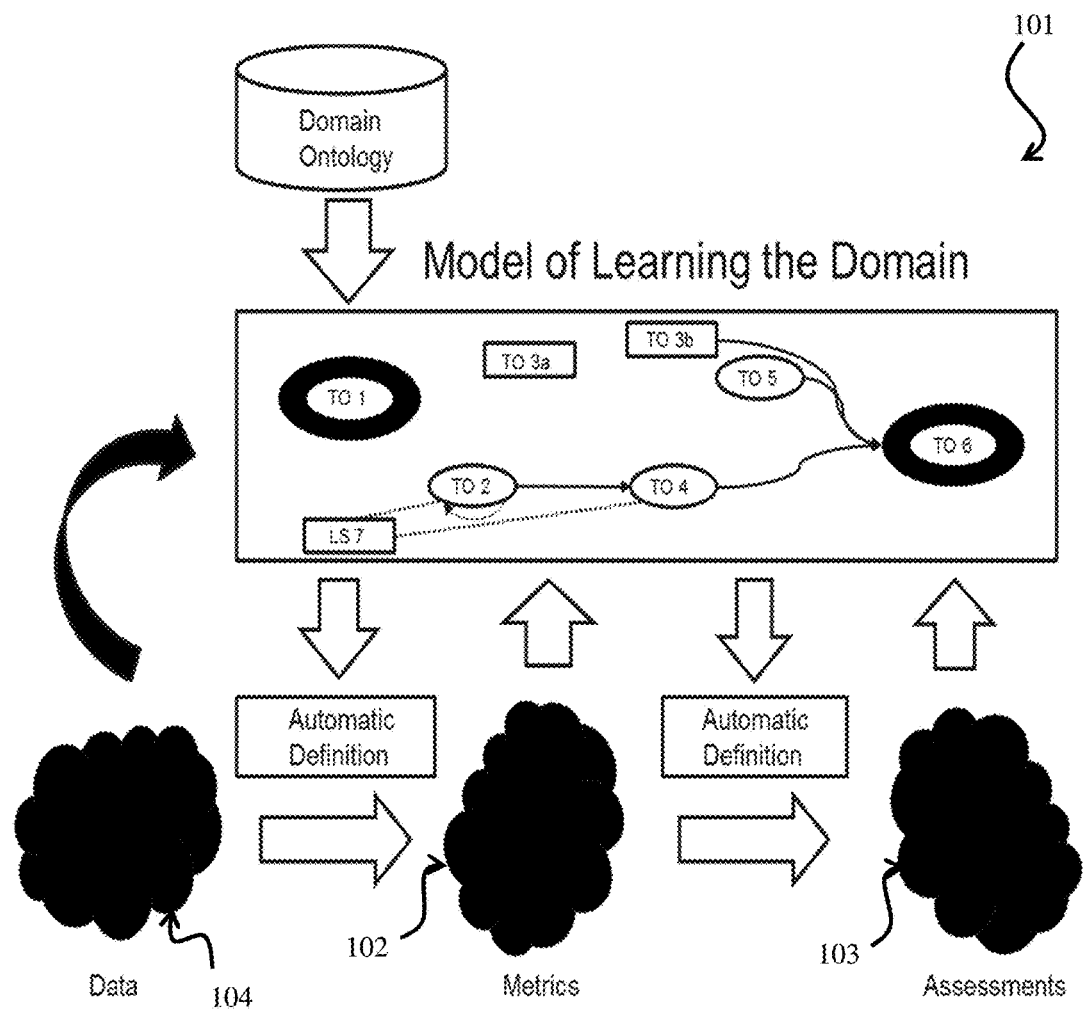
FIG. 1 illustrates high level functional diagram illustrating the general concepts of one embodiment of the invention.

Systems and methods to customize student instruction will now be described in detail with reference to the accompanying drawings. It will be appreciated that, while the following description focuses on a system that does customizes student instruction, the systems and methods disclosed herein have wide applicability. For example, the systems and methods described herein may be readily employed to determine career paths for employees to take or for use with other types of learning such as learning sports skills. Notwithstanding the specific example embodiments set forth below, all such variations and modifications that would be envisioned by one of ordinary skill in the art are intended to fall within the scope of this disclosure.

For illustration and not for limitation, the disclosed systems and methods to customize student instruction may be illustrated with a specific solution named Higher Automated Learning (HAL). HAL is one example embodiment of an intelligent diagnostic tool for learning management systems that may represent a students' progression within a learning domain. Embodiments of HAL may utilize a Partially Observable Markov Decision Process (POMDP) model, informed by a domain ontology, to model the learning the domain (a learning model). This representation goes beyond identifying the primary constructs (e.g., KSAs, TOs, etc.) of the learning domain and may represent the different states of learning and mastery that users will undergo in their pursuit of the learning the domain curricula. In some embodiments, this understanding of learning within the learning domain will further support training and development through the automatic generation of individually meaningful metrics and assessments that may be used by the model of the learning domain.

The conventional Intelligent Tutoring System (ITS) approach, namely developing a custom student learning model and using it to make scaffolding and content choices, requires extensive manual analysis of student performance products both for the initial student model and for any subsequent enhancements. There is no special provision for automatic definition of individualized metrics or assessments. The conventional Learning Management System (LMS) adaptive training approach—typically a lookup in a manually constructed table given student performance on a module—has no real power to generate definitions of metrics or assessments. In some embodiments, HAL provides a foundation for adaptive training that may be continuously improved based on student performance.

In some embodiment of systems and methods to customize student instruction, utilizing machine learning of the Model of Learning the Domain (MLD or learning model), especially in its Markov form, enables better, faster, automatic discovery of metrics and diagnostic assessments of student learning. The embodiments may utilize real student data, provide timely and effective intervention in the learning process, provide individualized instructional strategy and diagnosis for each student based on performance and more efficiently progress students through the learning domain as a result of early detection.

HAL may support automated metric and assessment definition for both existing courses and new courses. HAL's ability to identify latent student states and identify different paths (optimal and sub-optimal) through the learning domain may help instructors identify the relationships among key aspects of the learning domain and forecast the common pitfalls, or points of struggle, within the curriculum.

One Example Embodiment of Methods to Customize Student Instruction:

Embodiments of the learning model (model of learning the domain) may utilize human performance data, metrics, and assessments. Performance data may be raw data that may not by themselves be meaningfully related to KSAs or TOs. Three examples of raw performance data might be raw EEG signals or the stream of successive locations of an aircraft in a simulation, or the time at which an answer was to a specific question was selected in an online quiz. These data become metrics, that is, numbers that are meaningfully related to human performance, by combining them with other data and performing a computation on them. Three examples of human performance metrics might be the presence or absence of a P300 response in a set of EEG data, the deviation of an aircraft from its desired course in a simulation, or the time taken to respond to a specific question in an online quiz. In turn, these metrics become assessments when they are meaningfully interpreted: the size of the P300 in the EEG means that the event had a strong impact on the person; the size of the deviation from planned course puts the pilot in the category of Journeyman; and the slowness of response to the quiz question means the person has not yet automatized the material.

Currently many metrics are based on speed or correctness, and many assessments are binary performance standards. These generally do not provide rich diagnostic or pedagogical value. In HAL, we propose to automate the definition of metrics and assessments in such a way that the metrics can be used to provide trainees with a sense of where they stand with respect to the proficiencies they need to develop, what their future performance is likely to be—given their current state of KSAs—in other aspects of the domain, and even what experiences they might seek out in order to improve most rapidly.

As shown in FIG. 1 at a high level, some embodiments of the disclosed systems and methods are able to create the learning model 101, learn the learning model, construct metrics 102 which diagnose student state in the learning model, assess the consequences of a student's current state, and use human performance data 104, metrics 102, and assessments 103 that are generated during training may to continuously improve the learning model.

Figure 2:
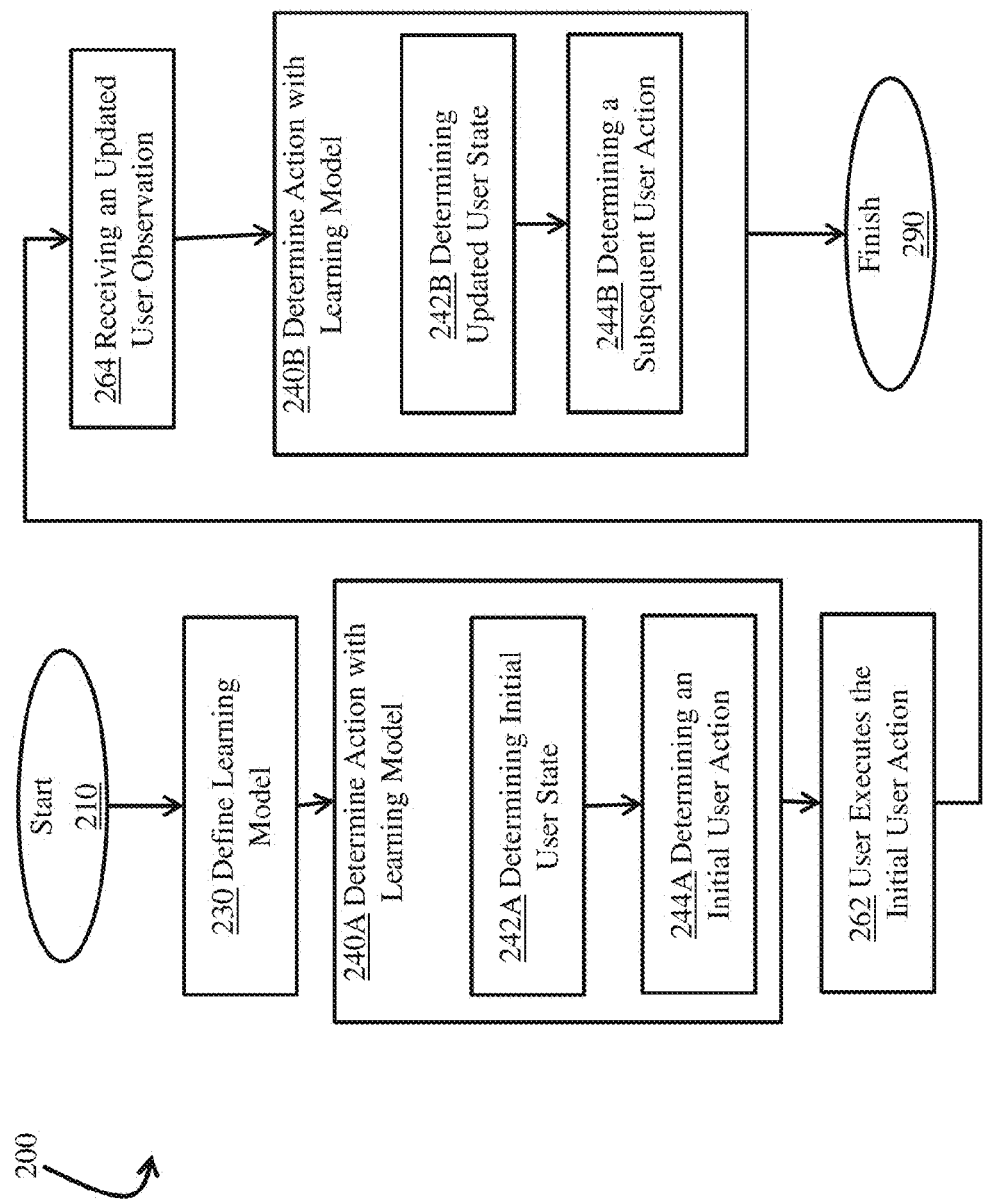
FIG. 2 shows a process diagram illustrating the general concepts of one embodiment of the invention.

Utilizing this general framework of the learning model, one example embodiment of the present methods of customizing student instruction is shown in FIG. 2. As shown in FIG. 2, the methods to customize student instruction generally comprises defining a learning model of a learning domain at 230. Prior to obtaining updated data from use of the learning model, the learning model may be an initial learning model. The learning model may comprise a plurality of learning domain states, at least one learning domain action, at least one domain learning domain state transition and at least one learning domain observation. At 240A, the methods determine an action with the learning model by determining an initial user state at 242A, determine an initial user action from the at least one learning domain action with the initial learning model given the initial user state as the at least one learning domain state at 244A, receive a user observation of the user at 264 after the user executes the initial user action at 262. With the updated user observation, the learning model may determine a subsequent action at 240B by determining an updated user state at 242B and determining a subsequent user action from the at least one learning domain action at 244B. Although not shown, these methods are suitable to be reiterated. For example, after determining the subsequent user action at 240B, the user may execute another action which will generate another user observation that can again be used to determine another action. This method of utilizing a learning model is very suitable for use with a learning domain where the actions are selected from materials such as a test of problem and the user observation is a measure such as a score on the problem or test.

Utilizing the benefits of human performance data, metrics and assessments, an initial learning model may be constructed. Starting with an ontology of the learning domain and a set of classes, principles, KSAs and TOs derived from it, an initial learning model may be built from the best estimates of domain experts who may or may not have experience training others in the domain. In some embodiments, a POMDP (Partially Observable Markov Decision Process) model is used to represent the learning model.

Representing the learning model as a POMDP makes it possible to construct metrics which diagnose student state in the learning model. Student state is not directly observable from the data but rather must be inferred from metrics. The Partially Observable Markov Decision Process (POMDP) used in HAL may contain an "observation model" which will specify the probability of obtaining the observed data given the student's state. The resulting probability table may be leveraged to identify the metrics which indicate each student state. These metrics may be suitable for use in training; they can be used to compute the most likely state in which a trainee finds herself, or, more precisely, to compute a probability over learning model states for a given trainee. Given a POMDP, the mathematics for computing this distribution from previous performance data are known, and these constitute automatically generated metrics for the trainee. They make optimal use of available data to locate the student in the learning model.

Representing the learning model as a POMDP also allows assessment of the consequences of a student's current state. The assessment then involves describing the most likely trainee state (or at least the top two or three) in such a way that the metric becomes more meaningful. These descriptions will also be automated. In some cases, there will be links to the ontology ("You seem to be having trouble with the concept of variance.") but in others, the assessments will describe successor states, or provide an aggregate description of other students who find themselves in the same state. In all cases, assessments will describe the implications of being in that state on future domain topics ("Now that you have mastered the concept of variance, the concept of T tests will be considerably easier.")

In some embodiments of methods to customize student instruction, the methods may start by developing or selecting an ontology to support the HAL model and the user such as a machine learner. Ontologies are used as the framework for establishing an understanding of the domain and developing learning models (e.g., models that represent students' learning of the domain).

Ontology is an explicit formal description of concepts, their properties, relationships between concepts, and the values they are allowed to assume within a domain. Another way to define or characterize an ontology as taken from information science, one of the fields that popularized its use is, a dictionary of terms formulated in a canonical syntax and with commonly accepted definitions designed to yield a lexical or taxonomical framework for knowledge representation which can be shared by different information systems communities. Among other things, we can expect a precise definition to be associated with each concept and relationship type used within an ontology and that this technology is considered to be a particularly well suited means of supporting educational-technology systems.

Ontologies can assist the generation of content from knowledge representation in subject domain ontologies. The description and annotation makes properties and implicit knowledge explicit and content derived from ontologically represented subject, instruction, and user knowledge can be adapted.

Ontologies may comprise classes representing concepts (perhaps organized in taxonomies), attributes, sometimes referred to as properties or slots, to describe the features of the concepts, relationships that represent associations between concepts—usually binary, formal axioms to model sentences that are always true, functions that are special cases of relations and/or instances that represent elements or individuals in an ontology.

Figure 3:
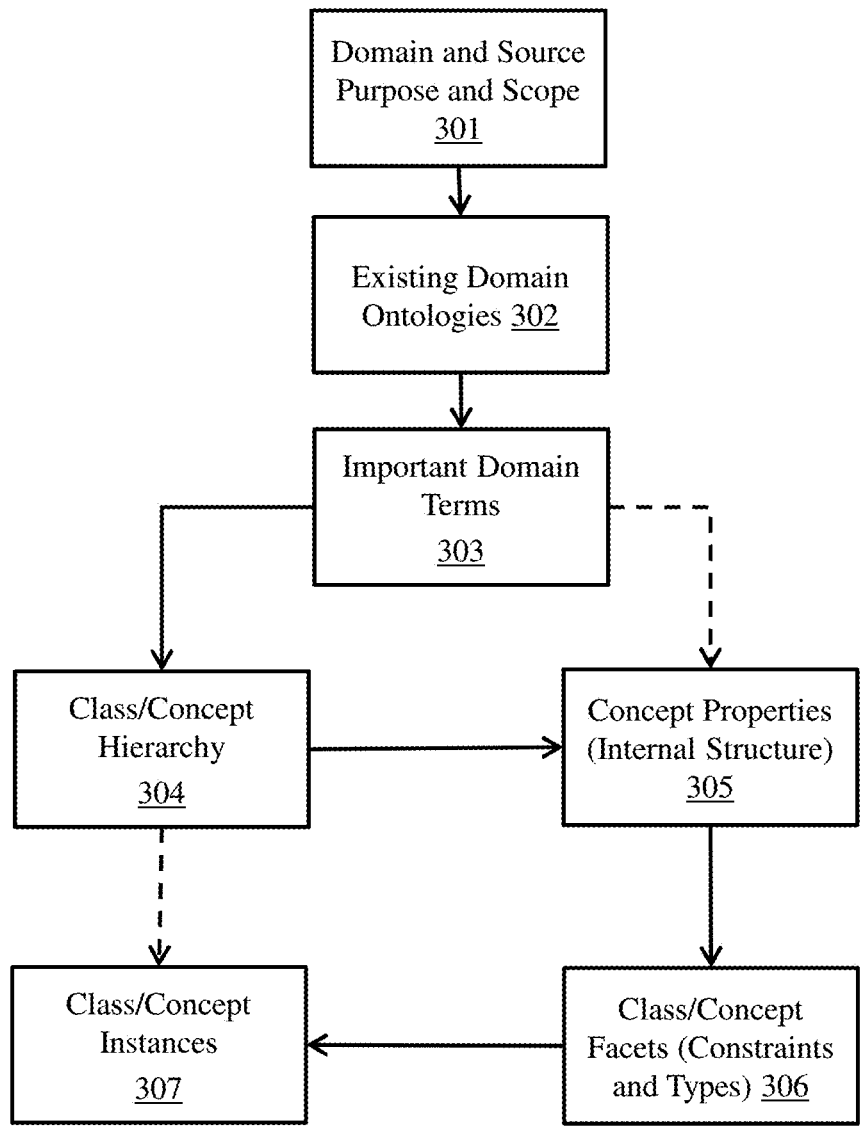
FIG. 3 illustrates one embodiment of the ontology development process

See FIG. 3 for an overview of the ontology development process. The process is initiated by determining the domain, source, purpose, and scope of the ontology at 301. Attention must be paid to deciding what sorts of questions the information in the ontology should provide answers at 302. Given an understanding of what an ontology is and how they are used, the next step is to enumerate important terms in the ontology at 303. The succeeding two steps are closely interrelated—entailing the defining of the classes (concepts) and the class hierarchy while defining the properties of the classes. Determining the hierarchy of classes at 304 can be accomplished in a number of different ways. A top-down approach starts with the definition of the most general concepts in a domain and continues with more specialized concepts. The bottom-up approach starts with definitions of the more specific classes and clusters or groups these classes into more general concepts. Once the classes and hierarchy have been specified the next effort is to describe the internal structure (properties) of the concepts at 305. The list produced when enumerating important terms in the ontology is significant. The next activity is attaching facets to the properties at 306, i.e., describing the value type, allowed value, the number of allowed values, and other features that are deemed to be significant.

Thus, constraints are placed on the types of data that are allowed. Creating instances, that is, examples of each of the classes is the final activity at 307.

Having an ontology developed which defines the fundamental components (e.g., problems, tests, quizzes, homework data, etc.) and data to be used for development, an intelligent mathematical model of the student from those building blocks can be created such as with a Partially Observable Markov Decision Process (POMDP).

The POMDP is a statistical Bayesian approach to decision/theoretic planning under uncertainty. A POMDP extends the classic Markov Decision Process, and is used in Operations Research and Computer Science domains such as assisted living, patient management, spoken dialog systems and intelligent training and tutoring systems. POMDPs are used to solve problems in which there are observable variables (e.g., performance measures) and non-observable variables (e.g., current capabilities of the student). One approach to mathematically modeling the student is to combine multiple sources of observable information and hypotheses about non-observable information to form an optimized plan called the "POMDP policy" that transitions the student through a sequence of instructional items in a module (e.g. classes or other groupings of concepts from the ontology). Thus, for any given student for which we have collected data, our mathematical modeling approach can determine the individualized sequence of instructional items based his or her needs. For example, for a student that fails every quiz, the branches will invoke easier and easier learning modules. Similarly for a student that performs well on every quiz, the learning modules chosen will be harder and harder. For the student who performs well in some skills but poorly in others, the instructional items will be selected to exercise those skills.

A Partially Observable Markov Decision Process (POMDP) may be defined with the tuple: M=(S, A, P, Ω, O, R, T such that:
S is a set of states
A is a set of actions
P is the state transition probability table: P (s'|s, a),
Ω is the set of observations.
O is the observation probability function: O(o|s',a,s'),
R is the reward function: R(s, a), the immediate reward for being in state s and taking action a.
T represents the number of time steps in the problem. If T=∞, we introduce a discount factor γ between 0 and 1, the reward at each step is multiplied by γ.

The state space in the analysis is determined from the set of individual competencies for the domain (e.g., "Newton's Laws", "Kirchoff's laws", etc.). The set of competencies may be provided by Subject Matter Experts (SMEs) or they may be learned from student data. State may be factored, i.e. we number the competencies from 1 to n (e.g. "competency 5 is Newton's Laws"), then for each competency numbered i we create a set $S_i$ consisting of the number of possible levels for the competency (e.g., 1="novice", 3="intermediate", 5="expert"), then we create the state space S= $S_1 \times \ldots \times S_n$ where each $S_i$ represents a number of possible student levels on competency. A POMDP solver tracks the distribution of possible states that the trainee may be in. This is formally referred to as a belief state, b∈P(S).

The set of actions is the available learning modules accessible to the instructor. Each learning module is tagged for its difficulty level in each of the competencies. This is used to help define the state transition probability table P (shown as the Transition Model 401 in FIG. 4). For example, difficult learning modules will have a positive effect on advanced students, whereas novice learning modules will have a positive effect on novice students.

Figure 4:
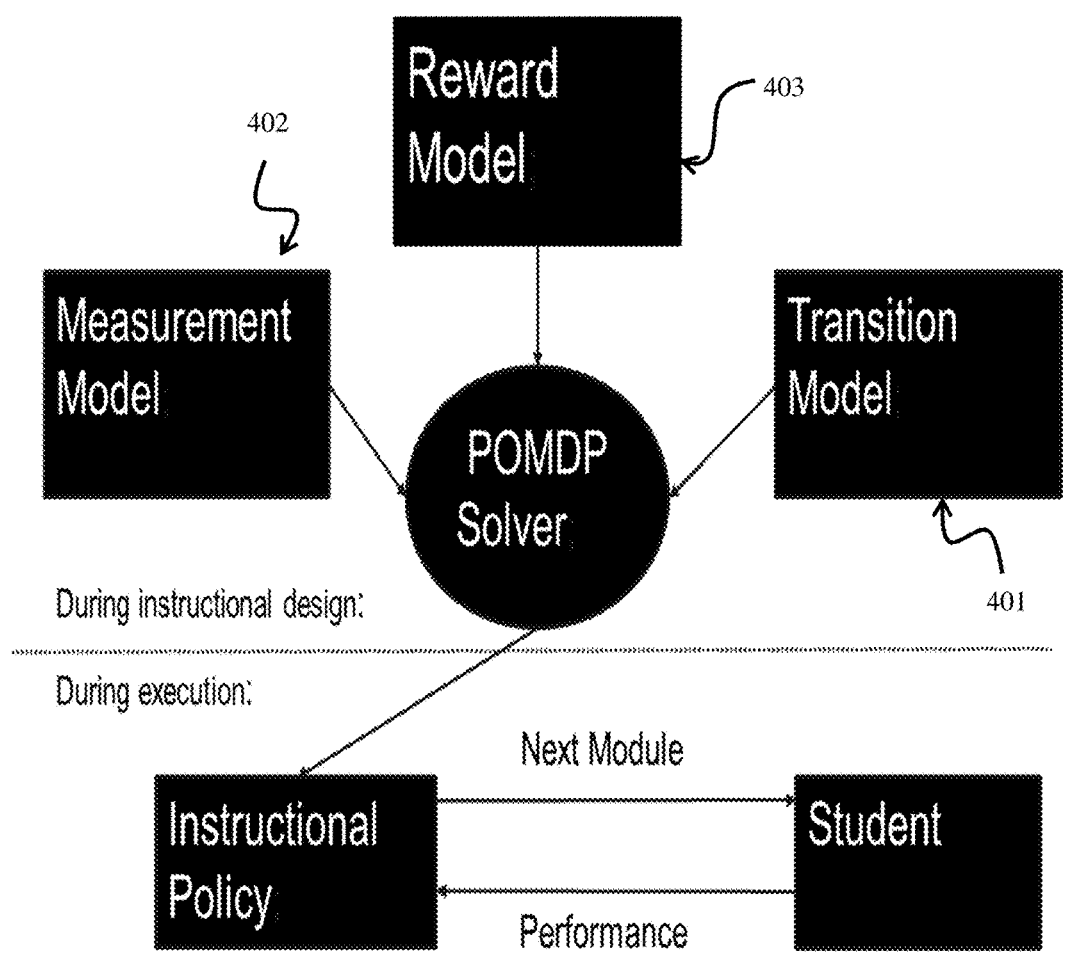
FIG. 4 illustrates a high level function diagram of one embodiment of a POMDP framework.

After each action, an assessment will be made as to student performance, defining the observation probability function (defined as Measurement Model 402 in FIG. 4). The probability function will specify the accuracy of assessment. Define the set of possible observations Ω. For example, at the level of a quiz the set Ω is the set of all possible quiz scores. As a second example, at the level of a question the set Ω may be correct/incorrect. Define the observation function as a probability function (o ∈O|s∈S, a∈A, s'∈S), specifying the chance of a given outcome the previous a student state and learning item. Through use of this probability table, student state can be inferred. We view the goal of the proposed project to be the automatic generation of the observation probability function from the student data defined in Task 1.

The purpose of the learning model is to select actions at each step which maximizes student capabilities. This will be enforced through the reward function (labeled Reward Model 403 in FIG. 4). The learning model will receive higher reward for moving students into states of high competency. More important capabilities may be emphasized more in this reward model.

Finally, γ is a discount function on the reward. With each successive step, reward is multiplied by γ forcing the model to converge.

We summarize some aspects of the model below. A POMDP solver tries to maximize the total reward:

$$E\left(\sum_{t=0}^{T} r_t\right)$$

Given an MDP (ignoring the partial observability aspect for the moment), the object is to construct a stationary policy π: S→A, where π(s) denotes the action to be executed in state s, that maximizes the expected accumulated reward over a horizon T of interest:

$$E\left(\sum_{t=0}^{T} r_t\right),$$

where $r_t$ is a reward at time t. If the horizon is infinite (T=∞), it can be shown that the value of the policy is:

$$V_\pi(s) = \sum_{t \in S} R(s, \pi(s), t) + V_\pi(t) \cdot P(s, \pi(s), t).$$

Optimal policy value function is found as:

$$V*(s) = \max_a \left[\sum_{t \in S} R(s, a, t) + V*(t) \cdot P(s, a, t)\right],$$

and corresponding optimal policy is:

$$\pi*(s) = \mathrm{argmax}_a \left[\sum_{t \in S} R(s, a, t) + V*(t) \cdot P(s, a, t)\right].$$

More simply put, a policy denotes what action the instructor should take (e.g., what material should be presented), given a student state or an instructor belief about student state. This instructor belief about student state is being updated with each measurement of performance on each image and video.

The POMDP performs a similar operation by using the Bellman equation. It constructs a value function V for a policy which is a set of α-vectors, each of which is |S|-dimensional and whose components hold the value of the policy for that state. For each state, the subpolicy is chosen according to which α-vector holds the highest value for that state. The initial set of α-vectors is simply one vector for each action. At each step, the n-step policies are used to construct (n+1)-step policies through use of the Bellman equation below. V' represents the current set of α-vectors for the n-step policies.

$$V_\pi(b) =$$

$$\max_a \left(\sum_S R(s, a)b(s) + \gamma \sum_O \max_{\alpha' \in V'} \sum_S \sum_{S'} P(s, a, s')\Omega(o, s', a)\alpha'(s')b(s)\right)$$

Figure 5:
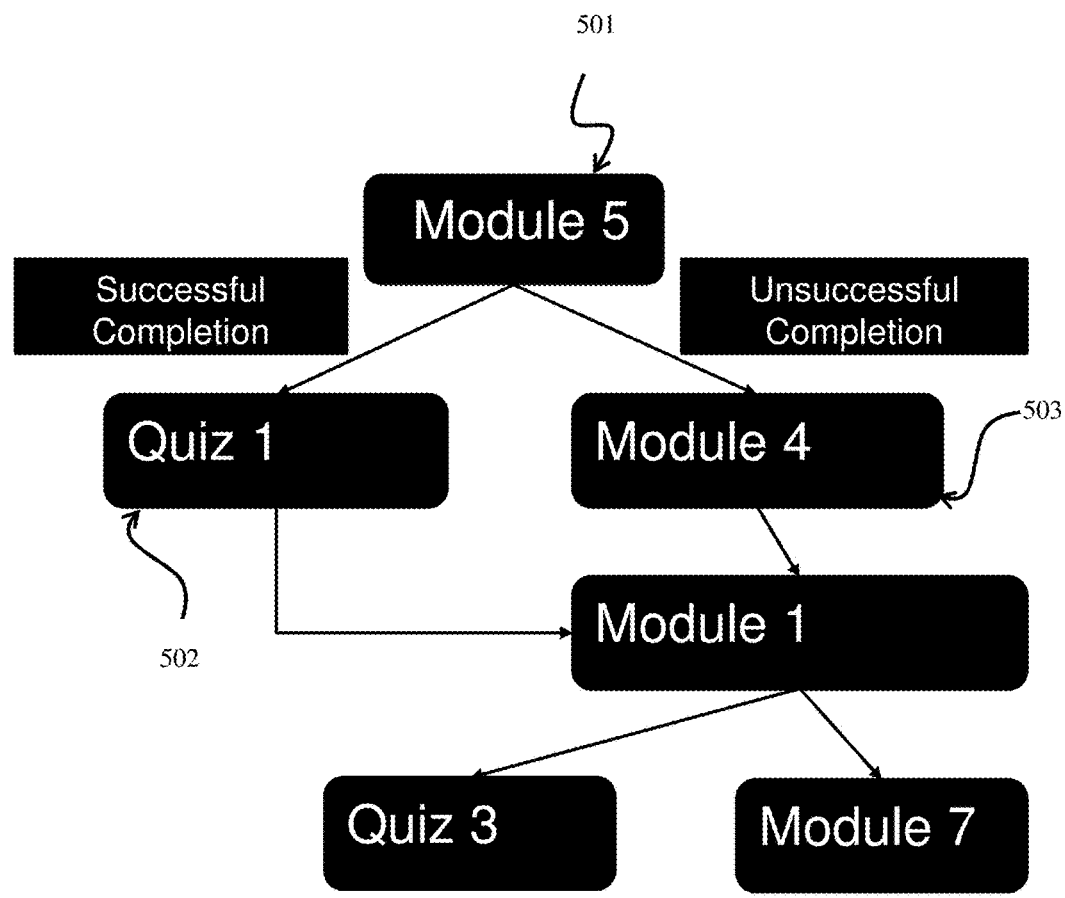
FIG. 5 illustrates a simple example of a POMDP policy.

That is, the value of a belief state is the value of the best (instructional) action that can be taken from that belief state, which in turn is the immediate reward for taking that action plus the expected reward based on the next observation that can be received, and assuming that the best sub-policy is taken after receiving that observation. The resulting model is fed into a solver to generate a POMDP policy, as shown in FIG. 5. This simple example policy starts at the top of the tree and proceeds downwards. Each arrow represents a possible observation. The student is presented with Learning Module 5 (501). If the student completes it successfully, Quiz 1 (502) is given. If not, Module 4 (503) is invoked. As opposed to this simple policy, computer generated policies may have hundreds of branches (observations) for each node.

One Example Embodiment of a Method to Customize Student Instruction Utilizing Auto-Generation:

Given the general methods described above to customize student instruction, some embodiments of the learning model utilize additional features to utilize the benefits of the data-driven implementations. For example, an ontology may be automatically built with Principal Component Analysis, transition functions may be automatically built with Hidden Markov Models (HMM) and state measures may be automatically build utilizing Item Response Theory (IRT).

Figure 6:
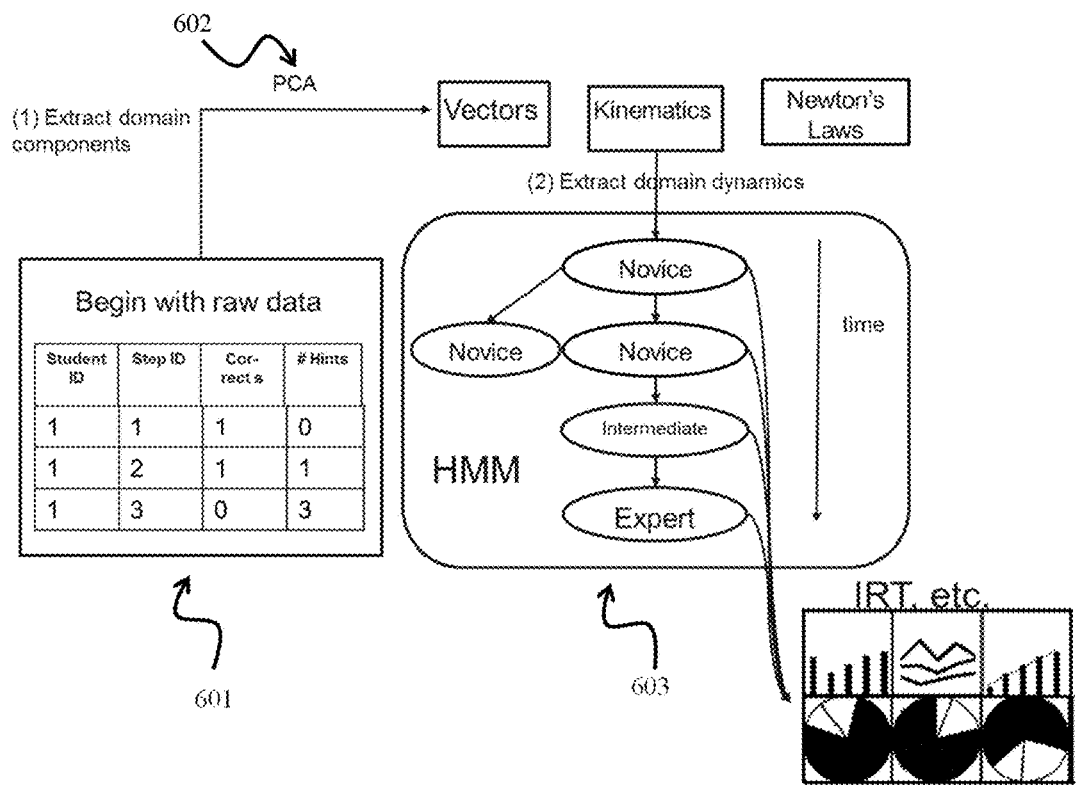
FIG. 6 illustrates a high level functional diagram illustrating the general concepts of embodiments to automatically determine elements of the learning model.

For illustration purposes and not for limitation, a general overview of one example embodiment of the invention comprising a hybrid method for data-driven instructional design is shown in FIG. 6. As shown, raw data 601 comprises test items and their features. Principal Components Analysis (PCA) 602 casts the data into fundamental components of the domain, creating a domain ontology. The components of the domain ontology may further comprise a set of learning domain states and elements identifying a level of expertise for each component. Item Response Theory (IRT) may be used to define the individual measurements of the state. Hidden Markov Models (HMMs) 603 may represent the student's measured progress through the state space. A proof of concept study, described below, indicates the promise of this hybrid method.

In some embodiments, human performance data, metrics, and assessments that are generated during training may be used to continuously improve the learning model. As the learning model obtains more data from each trainee, the model (consisting of probability tables) will adjust.

Some embodiments of the learning model are able learn and revise the learning model to improve the model. Using the parameter estimates described in the initial learning model as a starting point, HAL may use human performance data to learn a revised student model. This step is significant on the path to automatically constructing metrics and assessments, as the metrics and model must be compatible and both must be based on the data. Revising the learning model includes learning the set of student states contained in the data, learning the probabilities of transitioning between the learned states, and learning how the data can be used to infer state. The benefit of using human performance data to improve the learning model is that it will represent how different students actually learn the domain, as opposed to how the domain is logically structured.

For example, in a course on statistics, the concept of variance is just another concept in the domain ontology, but experienced instructors know that about 20% of the students have difficulty with the concept, and that failure to grasp this concept hurt their performance later in the course when advanced topics, such as t-tests, Analysis of Variance (ANOVA), and multiple regression—all of which are based on the concept of variance—are discussed. The ontology-based learning model would not reflect this fact, but the machine-learning-enhanced learning model would. The learning model thus describes the learning space for all students. Any individual student will visit only a portion of it on her way to mastery. Thus, determining a student's "location" in the learning model amounts to an individualized model of the student. FIG. 7A shows an initial learning model 701, as constructed from the ontology, and FIG. 7B shows a learning model 702 that has been modified by student learning data. In the latter, the old learning model state representing Training Objective 3 (TO3) has been split into two because it was discovered that the second half of that TO was not necessary for success in any but the last TO in the domain; and a new latent state (LS 7) was discovered that represented material that some students working on TO2 get struck on. It was also discovered that even if student could somehow get past TO2, they will have additional trouble with TO4.

Figure 8:
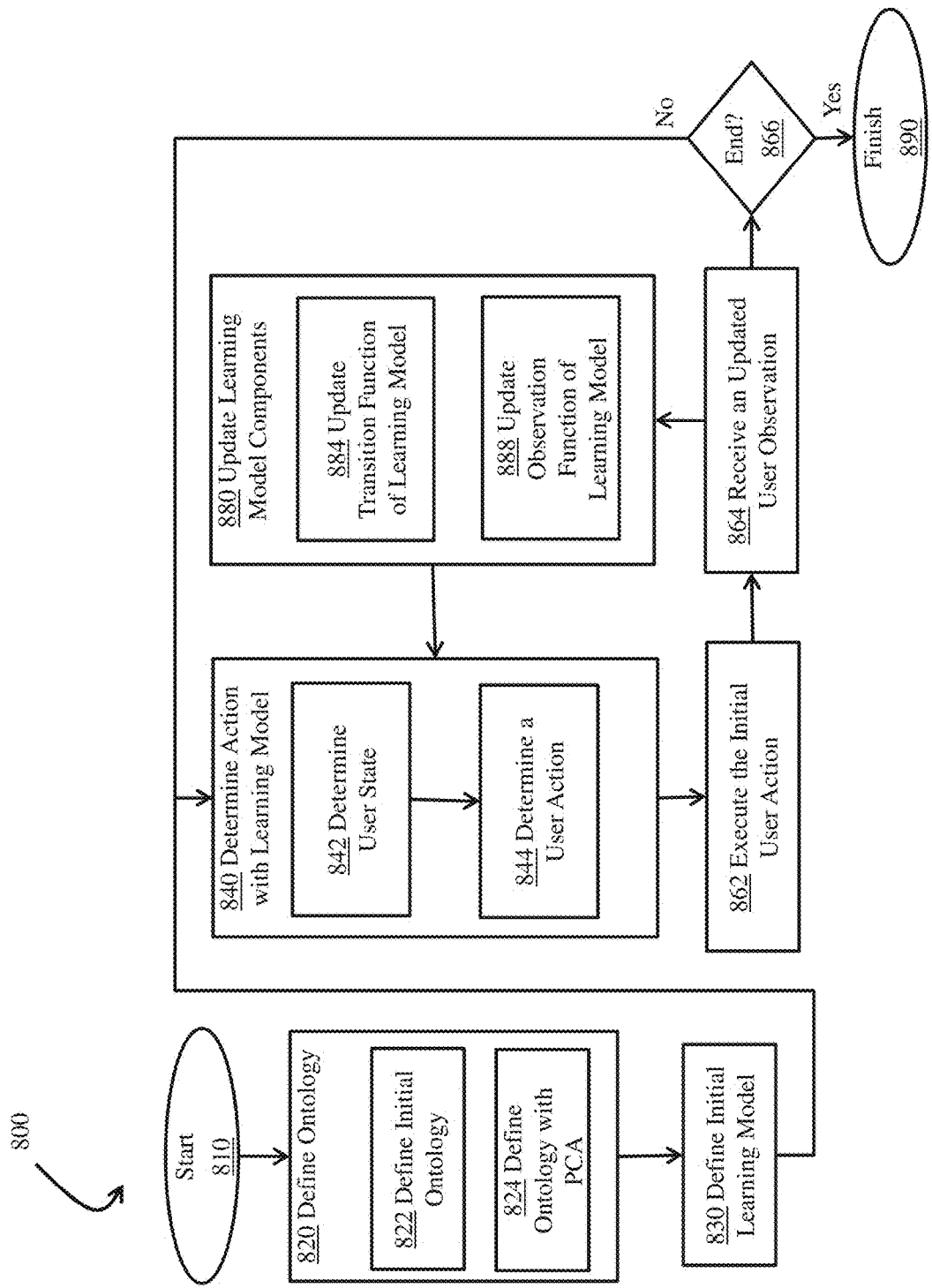
FIG. 8 shows a process diagram illustrating the general concepts of one embodiment of the invention.

FIG. 8 illustrates one embodiment of methods to customize student instruction that incorporates automatic generation of the learning model elements. Referring to FIG. 8, a learning domain ontology is defined at 820. This ontology is used to define the initial learning model at 830 which is used to determine an action with the learning model at 840. At 862 the action is executed and an observation of the user is received at 864. If the process is completed as decided at 866, the process finished. If the process is not completed, the user observation is used by the learning model to determine an action at 840.

Similar to the methods outlined at FIG. 1, the learning model of method 800 may comprise a plurality of learning domain states, at least one learning domain action, at least one domain learning domain state transition and at least one learning domain observation. At 840, the methods determine an action with the learning model by determining an initial user state at 842, determine an initial user action from the at least one learning domain action with the initial learning model given the initial user state as the at least one learning domain state at 844, receive a user observation of the user at 864 after the user executes the initial user action at 862.

Referring to FIG. 8, an ontology may be defined at 820 through different methods. An ontology may be defined at 822 as described above my manual methods. An ontology may also be defined at 824 automatically as defined below using techniques such as PCA algorithms. Automatically determining the learning domain ontology from a learning domain data set may comprise utilizing the PCA algorithm whereby the input is a plurality of learning domain problems and a plurality of learning domain observations and the output is at least one of the plurality of learning domain states. In embodiments where the learning model is a POMDP, the plurality of learning domain states from the PCA algorithm may define the plurality of learning domain states for the POMDP.

This embodiment of method 800 further comprises 880 where the learning model components may be updated. In this embodiment, at 884 the transition function of the learning model may be generated or updated. In one embodiment, the at least one domain learning domain state transition comprises a learning domain state transition probability table of P (s'|s, a) where s is the initial state, s' is the updated user state and a is the at least one learning domain action. In one embodiment, the learning domain state transition probability table is automatically determined utilizing a Hidden Markov Model (HMM) function where an input to the HMM function comprises a probability that the initial user state will change to the updated user state, a probability that the learning domain observation is obtained while the state of user is the updated user state and a probability of the initial state of the user. At 888, the observation function of the learning model may also be generated or updated. In one embodiment, defining the learning model of a learning domain further comprises automatically determining the competency measure such as by utilizing an Item Response Theory (IRT) algorithm. In one embodiment, the IRT algorithm comprises a conditional probability of getting at least one item correct given a latent proficiency score of the user and a difficulty level of the at least one item and the conditional probability of getting the at least one item correct given a latent proficiency score of the user and a difficulty level of the at least one item defines the at least one learning domain observation for the POMDP.

As described above, Principal Component Analysis (PCA) May be used to automatically build an ontology. PCA is capable of learning the state space and constructing an ontology from data such as human performance data and metrics. A PCA algorithm is a mathematical algorithm that helps to identify how strongly data are related to one another through use of the principal components of the dataset. PCA is commonly used to find patterns in high dimensional data where a simple graphical representation is not feasible. Through PCA, an instructor could be given similarity metrics that would rate some training exercises in terms of their similarity with other exercises. PCA uses eigenvectors to transform a set of observations of possibly correlated variables into linearly uncorrelated variables called principal components. This transformation is defined in such a way that the first principal component has the largest possible variance (that is, accounts for as much of the variability in the data as possible), and each succeeding component in turn has the highest variance possible under the constraint that it is orthogonal to (i.e., uncorrelated with) the preceding components.

In one embodiment of the subject invention, PCA is able to discover patterns in a learning dataset named Andes. While the Andes dataset already had labels, we wanted to attempt to discover patterns in student performance independent of those labels that would help to predict when a student would most likely struggle with a problem. PCA allowed discovery of the state space of the ontology of the Andes data without having to manually create it.

PCA helps to creates groups of similar data. A human may still be able to hand label the groups without having to label each individual problem. PCA helps to not only identify which problems should be associated with which group, but also where the groups diverge. This splitting of groupings helps especially with continuous data where it may not be clear when to classify one piece of data with one label or another.

For one embodiment, three dimensional data may be used that includes the learning domain problem, the student identification, and the student performance (learning domain observation) as our data set. The data were organized into a single matrix with the student number in each row, the problem name in each column and the student performance as the value for the intersection between student and problem.

Here we calculated the student performance as follows:

$$\text{Student Performance} = \frac{\text{number of correct steps} - (\text{number of incorrect steps} + \text{number of hints})}{\text{number of steps}}$$

Using the above formula, we were able to calculate each student's performance on each problem. Then, using PCA, we could identify similarities between problems based on student performance trends. These similarities allows predictions to be made concerning how new students would perform on one problem based on how well they performed on another similar problem without the need for labels.

PCA begins by taking in multi-dimensional data and subtracting off the sample mean for each dimension. With the newly centered data, we compute the covariance matrix using the following equation:

$$\text{cov}(X, Y) = \frac{(X_i - \overline{X})(Y_i - \overline{Y})}{(n-1)}$$

In one example embodiment, the above equation may be populated with x being one component from an ontology such as a Problem #1 and y may be another component from an ontology such as a Problem #2.

Next, the eigenvalues and their associated eigenvectors are computed for the covariance matrix. The eigenvalues are found by solving for the roots of the characteristic equation:

$$|A - \lambda I| = 0$$

The eigenvectors are then found by solving for the vector X in the following:

$$AX = \lambda X$$

In order to identify which dimension of the data contains the most information, we ordered the eigenvalues from largest to smallest. The last step in PCA is to multiply the eigenvectors by the original data. This will produce a new dataset with the same dimensionality as the original, but transposed to reflect the similarity of the data.

Figure 9:
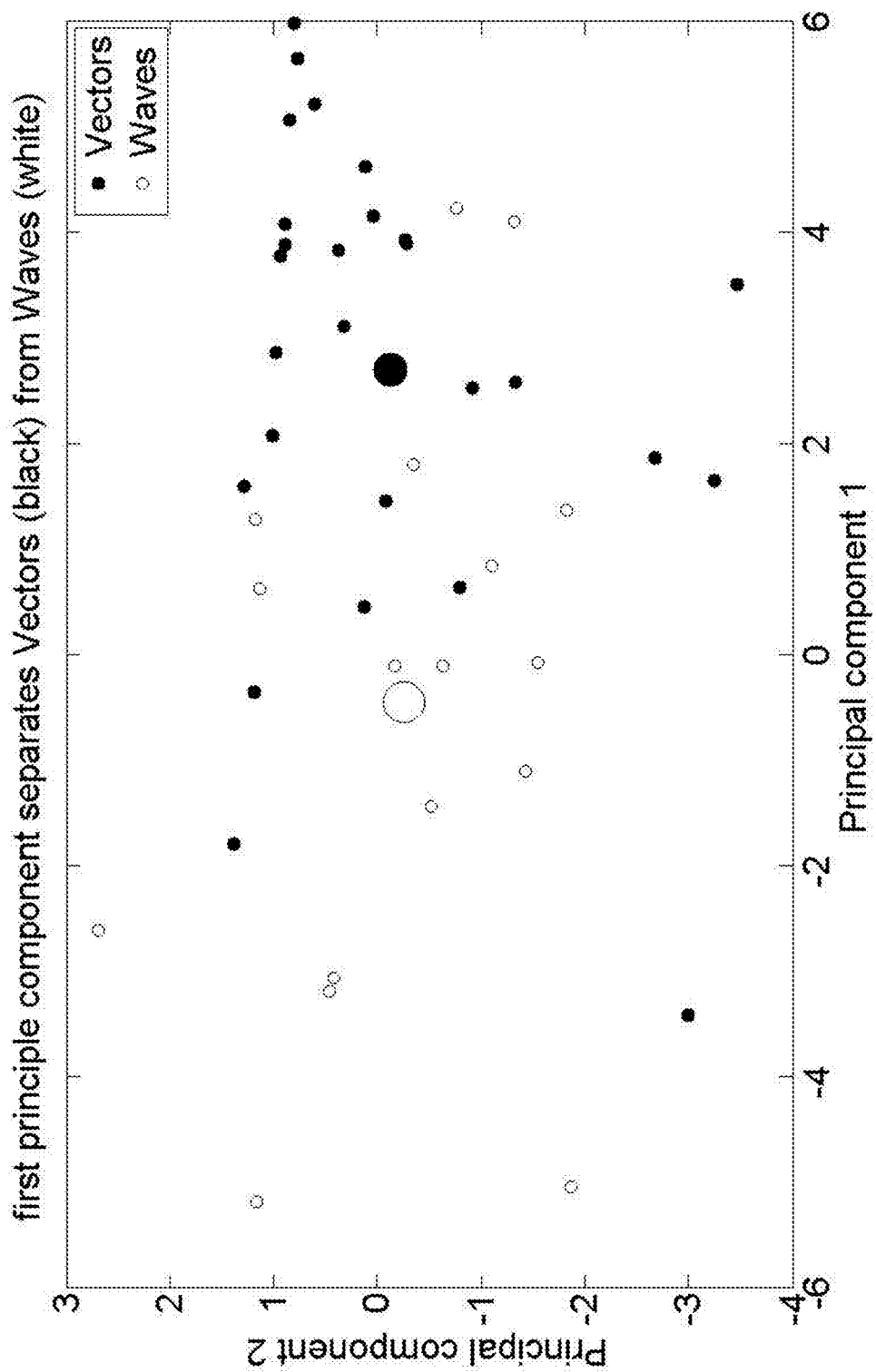
FIG. 9 illustrates first two principle components.
Figure 10:
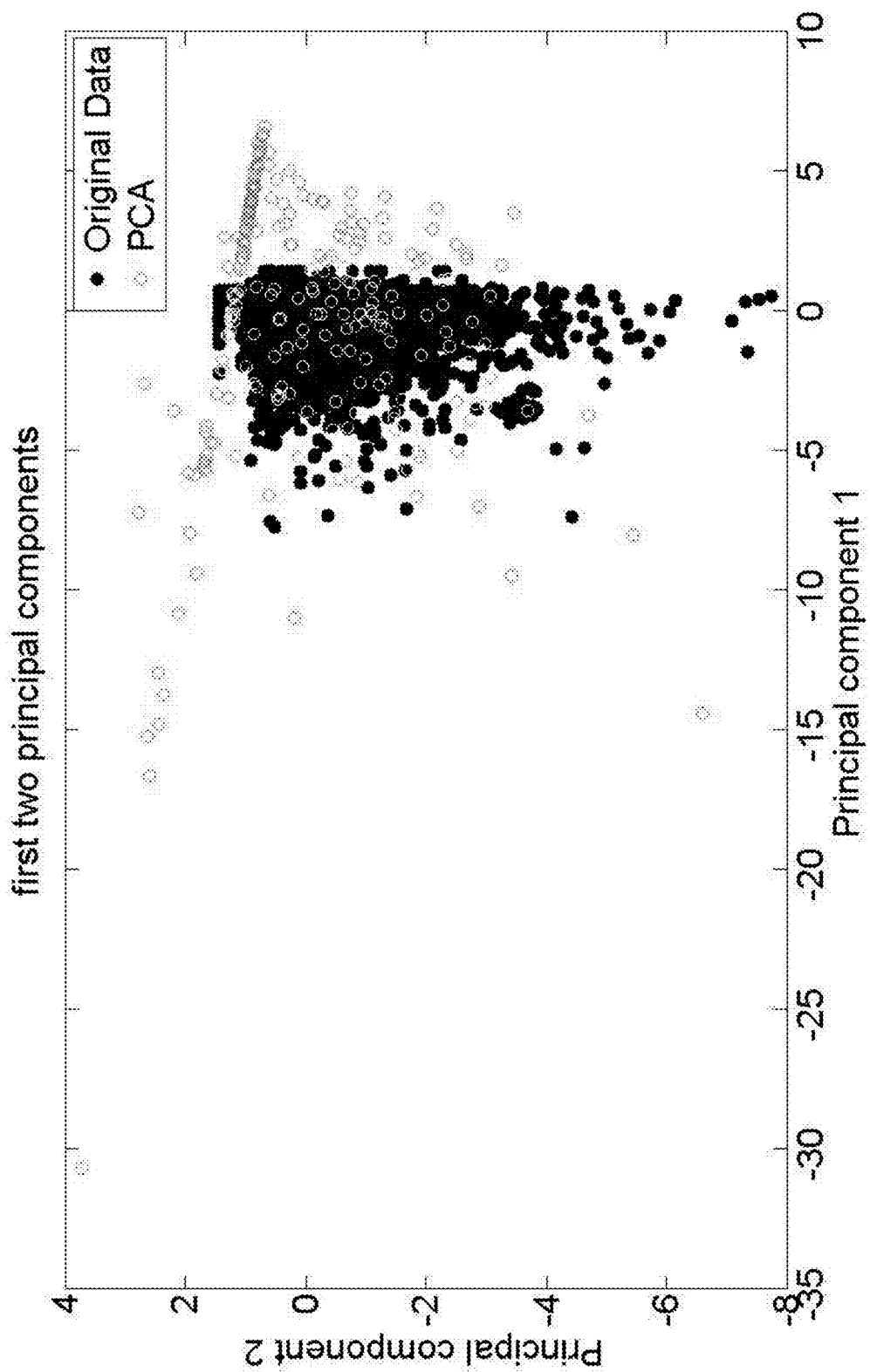
FIG. 10 illustrates first principle component separates Vectors (black) from Waves (white)

FIG. 9 illustrates how the PCA transforms the original data (black) to its first two principal components (white). The trend seen in the first two principal components will allow us to make a prediction of performance given only the problem and a general understanding of how the student has performed in the past. PCA can also be used to identify which problems are most like others. This feature can be seen in the plot in FIG. 10 (where we compared hand labeled classes to those discovered by the PCA). The labels discovered link back to a similarity between problems that can be discovered without any labeling needed at all and the problems that seem to be 'mislabeled' most likely just have more similar problem steps to the other category than their 'human labeled' one.

In one example embodiment of methods to customize student instruction, the input into the PCA algorithm is a set of learning domain problems and a score and other information on performance (learning domain observation) on that problem by some or all of the students. Other information may consist of number hints requested, time required to complete the problem, etc. The information (variables) output by the PCA algorithm is the set of states that a student can enter on their education path, and this corresponds to the set of states (state space) of a POMDP.

As described with respect to FIG. 8, the transition function of the learning model may be automatically generated. For example, Hidden Markov Models (HMM) may be used to automatically define the learning path where the learning path is a mathematical model of how a student traverses the learning domain states. At the mathematical level, this produces a probability that a student achieves a new state, given an old state and training content. These probabilities are then aggregated to define and assess learning paths. In some embodiments, we define the student learning path corresponding to the transition function of the Partially Ordered Markov Decision Process (POMDP) model using HMM techniques. This informs a prior probability on trainee/user state. This prior probability can be used both to better inform the actual measurement taken, and in some situations it may motivate the specific facets of performance to be measured.

Figure 11:
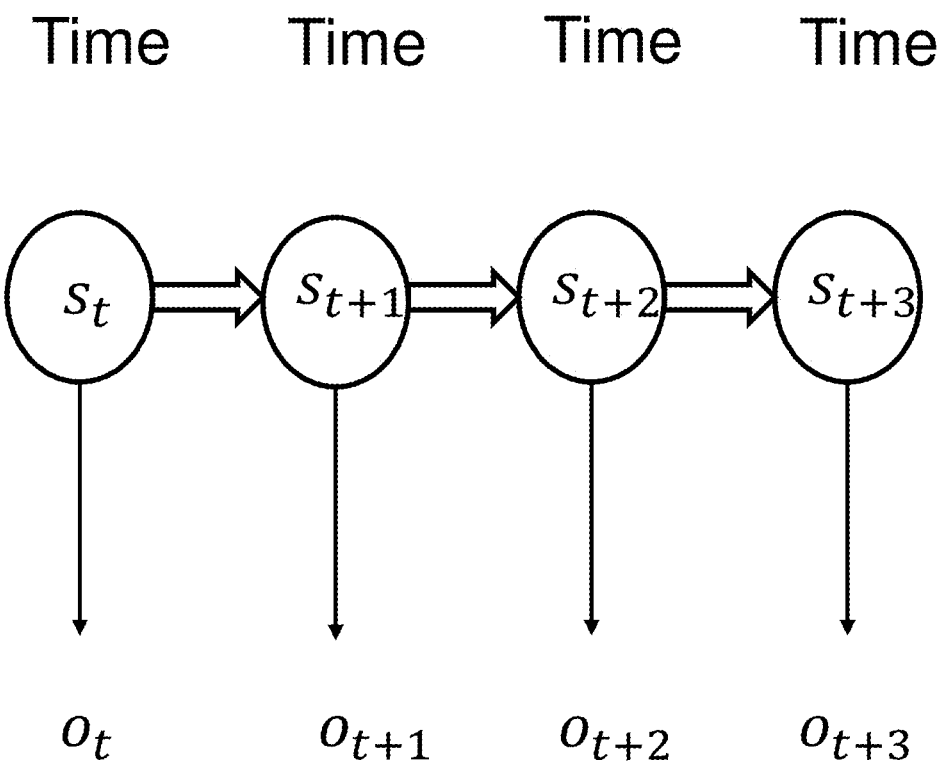
FIG. 11 illustrates State transitions within an HMM.

The learner path may be modeled as a Markov process as in FIG. 11. Learner progress is modeled as existing in a state, and the learner moves from state to state according to a probability table called the transition table. The subject invention provides a mechanism to automatically learn this probability table. At various points in time, student progress is measured (in the Andes data set, this measurement is performance on a homework problem). A second probability table, called the observation table, governs the probability of achieving a measurement given a student state. For example, a student in an advanced state on a training objective is likely to achieve a high score on a corresponding problem.

More formally, let the set of individual states be represented as $S=\{s_1, s_2, \ldots, S_N\}$ and let the true system state at time t be $s^t$. Additionally, let M be the number of possible observations that can be obtained at any given time so that the set of feasible observations is $V=\{v_1, v_2, \ldots, v_M\}$, and at time t we obtain a measurement (observation) $o_t$. Each observation in the set can consist of multiple measurements or features. That is, the item encountered by the student at time t produces a measurement in its row of the database, and this measurement comprises all of the information in the row of data besides the item name. The HMM is defined by specifying the state dynamics process, an observation process, and the prior information. The state dynamics process is represented as a probabilistic state transition graph, in which we define the state transition probability distribution $A=\{a_{ij}\}$, where $$a_{ij}=P(s^{t+1}=s_j|s^t=s_i), 1\le i, j\le N.$$

In the above, $a_{ij}$ is the probability that the learner state will change to $s_j$ given that the learner is currently in state $s_i$. The observation process is represented as a stochastic signal generated using conditional observation probability distribution $B=\{b_j(m)\}$, where $$b_j(m)=P(o_t=v_m|s^t=s_j), 1\le j\le N; 1\le m\le M.$$

Here, $b_j(m)$ is a probability that the observation $v_m$ is obtained while the state of operator is $s_j$.

The prior information is represented as a belief about the initial state of the operator $$\pi_i=P(s^0=s_i), 1\le i\le N.$$

Here, $\pi_i$ is a probability that the initial state of the operator is $s_i$. As the result, we can represent an HMM as a tuple $\mu=\{A, B, \pi\}$.

One example of an example of state transition tables are shown in FIGS. 12A-12B. In these examples: Learning Domain States (and State Space) comprise Novice, Intermediate, Advanced and Expert; and Learning Domain Actions comprise Easy Education Module (ELM), Difficult Education Module (DLM). In these examples, each row represents student state before the instructional module is given to the student, each column represents the state after, and the table the entry represents the probability that this state will occur after the action. All rows must sum to one. In this example, we can see in FIG. 12A ELM helps novice students and in FIG. 12B DLM helps advanced ones. An example of an observation table is shown in FIG. 12C where each row is the score that the student receives on an action such as a quiz. Each column is the percent chance of their TRUE actual ability or state. Rows must sum to one.

In summary, our observations of the system, in the form of the measures to be developed, are generated by the underlying operator state. We then use these observations to solve the problem of discovering which of the possible underlying states is most likely to have produced what we observed at any given time. This information together with additional contextual information drives recommendations to the adaptive aiding system.

As described with respect to FIG. 8, the observation function of the learning model may be automatically generated. For example, Item Response Theory (IRT) may be used to identify items' relative difficulty to help define individual measurements of the states.

Discovering meaningful measures of student performance empirically may be done by investigating the homework items themselves. As described earlier, we identified the principal components using PCA, allowing the methods to know on what concepts in the learning domain ontology the environment is training and testing the students. A logical next step therefore, is to further study the items related to the concepts to understand more about how the individual items demonstrate the students' knowledge of the principal components. Using IRT to assess item difficulty provides us with a meaningful measure that can facilitate timely interventions within an adaptive training environment.

IRT comprises a set of techniques for fitting non-linear latent regression models to item responses. IRT models represent the probability of an item response in terms of both examinee and item characteristics, such as item difficulty.

IRT was developed because of the inability of Classical Test Theory (CTT) to resolve pragmatic issues such as test development, scoring, and maintenance in large-scale high-stakes testing. IRT offers several advantages over classical measurement methods, including (a) the ability to estimate an examinee's proficiency score independently of the particular items, as well as number of items, administered; (b) estimating item parameters (e.g. item difficulty) independent of the particular sample of examinees; (c) comparing test scores across different tests, such as in a pre-test/post-test design; and (d) predicting an examinees performance on items not yet administered, such as in adaptive testing. Traditional testing often calculates indices of difficulty and discrimination for each item (once data are available), but these statistics are normally used as quality assurance measures to understand the functioning of individual items.

FIG. 13A presents a simple illustrative example of the scoring of a typical, CTT-based measure. Although each item would typically be scored with an equal number of points for choosing the correct response, we can see in this example that the measure is actually composed of items of varying degrees of difficulty. In this example, the respondent was presented with ten items and answered seven of them correctly. These correct choices included all three items that are actually easy, and all four items that are actually moderately difficult. In this example, the respondent chose incorrect responses to all three very difficult items.

FIG. 14 displays a second illustration of the same CTT-based measure. In this example, the respondent also chose the correct responses to a total of seven items. Thus, this second respondent would receive the same score as the first. However, the second respondent chose correct responses to only two easy items, three that are moderately difficult, and two very difficult items. Thus we can see that although these two individuals received the same score, the meaning of their scores is not necessarily the same. The differences could reflect the influences of a variety of sources of error, including fatigue and carelessness, as well as meaningful relevant differences.

Contrast the presentation of items in FIGS. 13A and 14 with the presentation displayed in FIG. 13B of those same items using an IRT-based method. In this method, the degree of difficulty in each item is considered in the order in which it is presented and how performance is scored. This is because IRT methodology establishes the characteristics of each item before the item is used operationally, and uses these characteristics to select items for presentation. Typically, if no additional information about the respondent's expected performance level is available, an IRT-based approach will begin with items of mid-range difficulty. If respondents make correct choices, they are presented with more difficult items, and if they make incorrect choices, they are presented with easier items until enough items have been administered to reliably establish the level at which the respondent chooses correct responses. In FIG. 13B, presentation began with moderately difficult items, which the respondent answered correctly, but was unable to answer the very difficult items correctly. In this situation, the respondent's score would equate to a description of falling mid-range along the continuum of performance on the measure.

Thus one conceptual distinction between CTT and IRT is that in CTT, the number-correct score, or a count of the number of items answered correctly serves as an indicator of a person's proficiency level on the construct of interest. This assumes the construction of a standard test, in which items of varying difficulty populate the test, and scores from different tests are comparable only to the extent that two nearly identical (parallel tests, in CTT jargon) tests can be constructed. In IRT, however, the assumption is that items can be ordered in increasing difficulty along a continuum of the proficiency scale, and a person's proficiency estimate is simply the point at which a person can no longer answer items correctly. The difficulty of an item can be mapped directly onto the proficiency scale, thus resulting in efficient score estimation. In CTT, adding or deleting items from a test can change the number correct score, thus making the score very sensitive to how the test is constructed. Likewise, keeping the same number of test items, but changing the difficulty level of each item by making the item either more or less difficult also changes the meaning of the number-correct score. It follows that comparing the simple count of the number of items answered correctly across two different tests requires that tests have the same number of items similar in difficulty. The inability of large scale test makers to accomplish this very difficult task of parallel test construction in a low-cost and efficient manner led directly to the increased development of IRT methodology.

In an IRT-based measurement scenario, as long as the item difficulty parameters can be arranged in increasing order of difficulty, and the item difficulty parameters can be directly mapped onto a proficiency scale, the actual set of items administered need only to consist of those items that provide a sufficiently reliable estimate of the point at which the respondent's point of failure begins. If a respondent's prior proficiency can be somehow estimated, and administration of the measure begins with items not too far below the respondent's threshold for failure, the measure can be dramatically shortened. This was the idea that has culminated in the development of adaptive tests. The maximum Fisher information (MFI) method, which selects the next item with the largest Fisher information at the current estimated ability ($\hat{\mu}$) level, is widely used in current CAT programs. This approach capitalizes on the psychometric property of a test, and thus should provide the most accurate ability estimation.

The most basic model underlying the IRT methodology is the 1-parameter model, which mathematically represents the probability of obtaining a correct answer on an item by the following equation below:

$$p(X_i \mid \theta_s) = \frac{1}{1 + e^{-(\theta_s - \beta_i)}} \quad (1)$$

In this equation, $\theta$ is a person parameter representing the latent proficiency score of the $S^{th}$ person, $\beta$ is an item parameter representing the difficulty level of the $i^{th}$ item, and $p(X\mid\theta)$ represents the conditional probability of getting the $X^{th}$ item correct given a proficiency level of $\theta$. In this model, both $\theta$ and $\beta$ are represented in the same scaling metric, such that whenever $\beta=0$, the probability of success for the item $X_i$ is $P(X\mid\theta)=0.5$. It is fairly common that both $\theta$ and $\beta$ are scaled in z-score metrics (Mean=0, SD=1) such that $\theta=0$ denotes an individual of average proficiency and $\beta=0$ denotes an item of average difficulty.

From the preceding formulation, it is easy to imagine a set of homogeneous (i.e. equal difficulty) items for which a particular examinee, S, gets half of the items correct and half of the items incorrect. If the item difficulty parameter for each item is $\beta=+1.2$, we would be able to conclude that examinee S performs at a proficiency level of +1.2 z-units above the average examinee. No additional items of lesser or greater difficulty are needed in this unique case, because the set of items given to the examinee has been perfectly adapted to the individual. Finding such a set of items that are approximately of the same difficulty is significant to successfully implementing an adaptive testing procedure.

In reality, the 1-parameter model rarely works well as a model of real data. A better alternative is the 2-parameter model shown below:

$$p(X_i \mid \theta_s) = \frac{1}{1 + e^{-\alpha_i(\theta_s - \beta_i)}} \quad (2)$$

In the 2-parameter IRT model, an extra parameter $\alpha$ has been added that signifies that the conditional probability of success on each item is differentially related to proficiency level. The item parameter $\alpha$ is often called the item discriminating parameter, and it represents how sensitive the item success probability is to variations in proficiency level. For example, if we suppose that $\alpha=0$ for a particular item, we can see that the probability of success (p=0.5) is the same for all proficiency levels, and therefore the item is insensitive to variations in proficiency level; it can thus be stated that the item provides no information for estimating an individual's proficiency level. The IRT alpha parameter has a very strong mathematical relation with the loadings from a (non-linear) factor analysis; that is, the unidimensional model assumption that all items have an equal alpha parameter is equivalent to a model in which all factor loadings are assumed to be equal, yet multiple research studies have suggested this is not reasonable for most real-world datasets. Fortunately, the 2-parameter model has been successfully applied to many different research areas and is commonly applied to tests for which the multiple-choice format is not in use.

Figure 15:
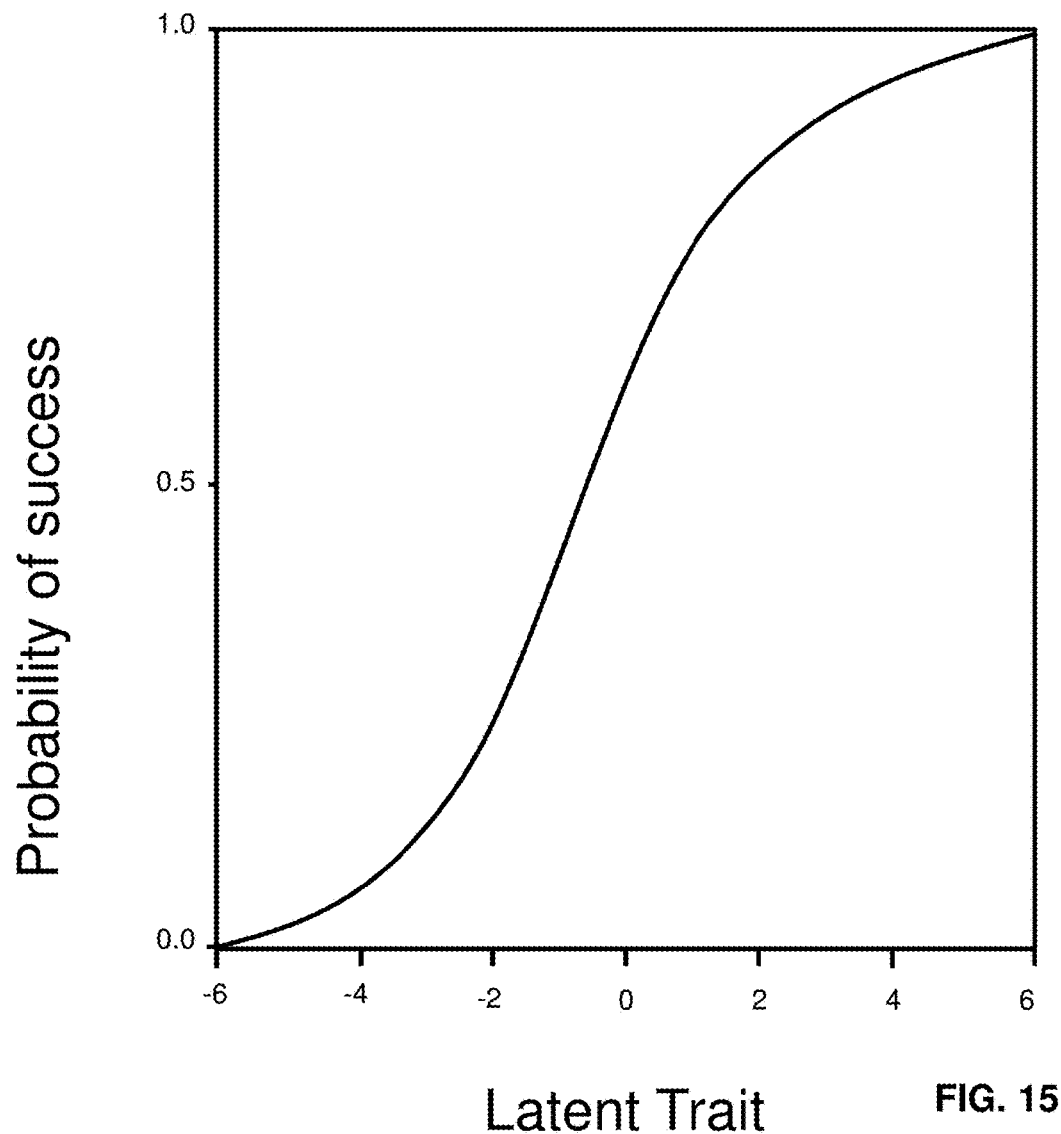
FIG. 15 illustrates an item characteristic curve describes the relationship between likelihood of responding correctly (success) to the underlying latent trait.

Item Characteristic Curves (ICC), sometimes known by its alternative name, the Item Response Function (IRF), provides a useful graphical description of how an item performs with respect to person proficiency levels. FIG. 15 presents an ICC for one possible item. The y-axis represents the probability of success (P(X|Θ)) on the item and it clearly varies with latent proficiency level Θ, which is represented on the x-axis. The graph shows that level of proficiency is scaled in a z-score metric (i.e. from −6 to +6). When proficiency levels are low (i.e. below −4), the probability of success is near zero. For high proficiency levels, the converse is true: the probability of success on this item is near one. More importantly, as proficiency levels rise, so too does the probability of success on the item. As can be seen from the figure, when the probability of success is at p=0.5, one and only proficiency level will correspond to that point on the y-axis. The difficulty level of the item is defined as the proficiency score where p(X|Θ)=0.5. This is the direct mapping of item difficulty into the proficiency score metric that makes IRT methodology more appealing than CTT methodology, and suggests that this item is an ideal measure for individuals of average proficiency (item difficulty=0). The slope parameter ($\alpha$) for this item is defined a proportional to the slope of the ICC where p(X|Θ)=0.5; in the figure the slope is positive. Flat ICC's (i.e. $\alpha$=0) are suggestive of items that are unrelated to changing proficiency levels, and should be avoided. FIG. 15 also can be used to graphically illustrate three assumptions of the classic IRT mode.

First, that the probability of success on an item is a monotonically increasing function of latent proficiency. Second, the nature of the ICC is decidedly non-linear due to binary response outcome. Third, only a single proficiency dimension is needed to capture the empirical outcomes of this item. Whereas IRT models have been recently developed for which these assumptions are no longer necessary, we will suggest later a model which is consistent with the first two assumptions, but relaxes the third assumption of unidimensionality.

In the late 1960's, a number of alternative unidimensional IRT models were developed to handle unique testing circumstances. Among these were models to handle the unique aspects of multiple-choice tests (i.e. guessing), models to handle ordered, non-binary data, and models to handle the possibility of partial-credit scoring on standard tests.

Unlike CTT, estimating multiple-IRT (M-IRT) model parameters requires a computationally complex algorithm. Only iterative solutions exist for the parameters of the model so computer-intensive computational methods are required. The basis for most calculations is to optimize the likelihood function for the data, using either Marginal Maximum-Likelihood (MML) methods or Augmented Bayesian (BAYES) methods. Calibration may proceed in three steps. First, initial estimates of the item parameters are used to seed the optimization process. Usually, known mathematical relations between the item parameters (difficulty, discrimination) and factor-analytic counterparts are used as preliminary item parameters. In many programs, this involves calculating an exploratory factor analysis using a tetrachoric correlation matrix as input, and then using the factor loadings and intercept estimates as the seed values for the IRT item calibration process. For very complex models, the initial estimates can be significant for ensuring convergence in the second step of the calibration phase. In the second step, estimating item parameters occurs by maximizing the Likelihood function using either MML or Bayes. The first step in the initial calibration process is to remove the influence of the unknown latent parameters (the θ's) by integrating them out of the likelihood function. This step involves the use of a numerical integration routine—usually a M-fold Gauss-Hermite quadrature (histogram approximation) method. Because the accuracy of the item parameter estimation depends to some extent on the accuracy of the numerical integration, the number of quadrature points (i.e. bins of the histogram) and the sample size within each histogram bin need to be of sufficient size to allow for accurate results.

Once the numerical integration is completed, item parameters are estimated using an Expectation-Maximization (EM) algorithm. Although slow to converge, the EM algorithm has been shown to be quite successful at retrieving known population parameters via simulation. Once convergence has been obtained (i.e. the likelihood function cannot be optimized any further), the current value of the item parameters are fixed and used for the calibration of the proficiency scores for each person in step three of the process. Step 3 of the initial calibration process treats the item parameters from step 2 as fixed (i.e. as if they were population values) for the purpose of calculating proficiency scores. As before, either a Maximum Likelihood (ML) or Bayes solution can be obtained. The proficiency scores are scaled such that they fall along a z-metric, as the unit of origin and unit of measurement are arbitrary for latent variables.

Table 1 features a list of items and their calibrated parameters from the Andes data set. These are unidimensional modeling fit indices. Table 1 provides two least squares fit indices, the weighted mean square (WMS) and the unweighted mean square (UMS). Mean-square fit statistics indicate distortion in the measurement system. In general, mean-squares near 1.0 indicate little distortion of the measurement system, regardless of the standardized value. Values less than 1.0 indicate observations are too predictable (due to redundancy or data over-fitting the model), while values greater than 1.0 indicate unpredictability (un-modeled noise, data under-fitting the model) Table 1 also provides two Standardized fit statistics, standardized weighted mean square (Std. WMS) and standardized unweighted mean square (Std. UMS). Standardized fit statistics are usually obtained by converting the mean-square statistics to the normally-distributed z-standardized ones by means of the Wilson-Hilferty cube root transformation. These provide t-tests of the hypothesis "Do the data fit the model (perfectly)?" and are reported as z-scores. If the data actually did fit the model, their expected value would be 0.0. Less than 0.0 indicates too predictable and more than 0.0 indicates lack of predictability. Standardized values can be both positive and negative.

TABLE 1

Example IRT results for Andes dataset

| Item | Difficulty | Std. Error | WMS | Std. WMS | UMS | |
|---|---|---|---|---|---|---|
| item19 | 0.91 | 0.26 | 0.98 | −0.18 | 0.87 | −0.49 |
| item33 | 0.31 | 0.25 | 0.91 | −1.02 | 0.88 | −0.60 |
| item34 | 0.05 | 0.25 | 0.95 | −0.56 | 0.85 | −0.84 |
| item37 | 0.84 | 0.26 | 1.05 | 0.57 | 1.01 | 0.10 |
| item38 | 0.70 | 0.26 | 0.97 | −0.32 | 0.91 | −0.36 |
| item42 | 0.70 | 0.26 | 0.92 | −0.81 | 0.87 | −0.55 |
| item43 | 5.05 | 1.02 | 1.07 | 0.39 | 1.22 | 0.79 |
| item44 | −0.21 | 0.26 | 1.10 | 1.05 | 1.52 | 2.59 |
| item45 | 6.29 | 1.84 | 0.02 | −0.67 | 0.00 | 0.64 |
| item47 | −0.21 | 0.26 | 1.09 | 0.97 | 1.03 | 0.24 |
| item48 | −1.69 | 0.34 | 0.99 | 0.03 | 1.09 | 0.35 |
| item51 | 6.29 | 1.84 | 0.02 | −0.67 | 0.00 | 0.64 |
| item54 | −1.19 | 0.30 | 1.05 | 0.36 | 1.44 | 1.50 |

TABLE 1-continued

Example IRT results for Andes dataset

| Item | Difficulty | Std. Error | WMS | Std. WMS | UMS |
|---|---|---|---|---|---|
| item55 | 0.25 | 0.25 | 1.08 | 0.94 | 1.09 | 0.58 |
| item58 | −0.41 | 0.26 | 0.95 | −0.45 | 0.96 | −0.15 |
| item62 | −0.70 | 0.27 | 0.93 | −0.57 | 0.90 | −0.41 |
| item63 | −0.41 | 0.26 | 0.96 | −0.31 | 0.90 | −0.50 |
| item65 | −2.39 | 0.42 | 1.30 | 1.01 | 1.68 | 1.23 |
| item66 | −1.10 | 0.29 | 1.01 | 0.11 | 0.89 | −0.36 |
| item68 | 3.86 | 0.61 | 1.20 | 0.53 | 13.53 | 4.02 |
| item70 | −0.63 | 0.27 | 0.92 | −0.65 | 0.84 | −0.77 |
| item72 | −0.85 | 0.28 | 0.84 | −1.24 | 0.80 | −0.86 |
| item73 | −1.19 | 0.30 | 0.97 | −0.12 | 0.84 | −0.53 |
| item75 | −1.69 | 0.34 | 0.84 | −0.72 | 0.80 | −0.45 |

In this embodiment we used only the calibration algorithms from IRT. Our purpose was to learn more about the items to develop meaningful performance measures. In future embodiments the student proficiency estimation algorithms that are generally part of an IRT based adaptive environment may be superseded by the POMDP, or may provide inputs that help the POMDP continuously assess progression and recommend interventions.

To date, the modal application for IRT has been computer adaptive testing (CAT), particularly in high-stakes testing applications, such as the SAT standardized test used for college admissions. To confirm the absence of published material describing application of IRT to create adaptive training systems, one of the authors queried two research databases, the American Psychological Association PsycNET® and the EBSCO Host® Psychology and Behavioral Sciences Collection, using keywords Item Response Theory (as an Index Term for sources) and the text "adaptive training." Neither database provided any relevant results.

In an adaptive training environment (or Intelligent Tutoring System) the objective is slightly different from testing. In testing, a common adaptive approach is to select a next item that the student has a 50 percent likelihood of answering successfully, based on known item difficulty and the current estimate of the test-taker's proficiency. The goal in testing is an optimal assessment of the maximum level of item difficulty that the test-taker can answer correctly. In contrast, the goal of an adaptive trainer is to optimize learning by presenting training content that matches the learner's current level of expertise. An optimal strategy for an adaptive trainer would be to choose upcoming items that are slightly more difficult than the current estimated proficiency of the trainee. Slightly more difficulty items may be identified as those that the student is expected to have a 70 percent chance of successfully responding to correctly. It would also be effective for training to have sets of items that have differences but are also similar in ways relevant to the training as well as relatively equivalent in difficulty, and to randomly choose from among this set of items.

Another difference in extending the use of IRT methods to adaptive training is in the amount of data needed for item calibration. Studies examining the interactive influences of test length and sample size, have considered sample sizes of 200, 500, and 1,000, and found that samples of 200 produced unacceptable results. The larger sizes are consistent with typical recommendations for IRT calibration that are helpful to provide sufficient accuracy for testing and the decisions that are based on testing outcomes. However, in adaptive training applications, the stakes in establishing item difficulty are considerably lower, and thus, at least in initial application, it appears that the potential benefits to be gained in applying this adaptive approach will outweigh the risks that trainees may be presented with items (that is, training content) that may not be as precisely matched to the trainee's level of expertise as might be possible with more accurate calibration.

Scientists have been trying to automatically create models used by Intelligent Tutoring Systems for decades, with little success. However, combining 1) a PCA and HMM-based method to define a knowledge ontology that integrates as learned domain knowledge with 2) an IRT-based method for estimating and scoring item difficulty uniquely combines mathematical approaches typically used in very different domains, namely knowledge elicitation and high-stakes personnel selection.

One Embodiment of the System to Customize Student Instruction, a Learning Model System:

As will be readily apparent to those skilled in the art, systems and methods to customize student instruction can be embodied in hardware, software, or a combination of hardware and software. For example, a computer system or server system, or other computer implemented apparatus combining hardware and software adapted for carrying out the methods described herein, may be suitable. One embodiment of a combination of hardware and software could be a general purpose computer system with a computer program that, when loaded and executed, carries out the respective methods described herein. In some embodiments, a specific use computer, containing specialized hardware for carrying out one or more of the instructions of the computer program, may be utilized. In some embodiments, the computer system may comprise a device such as, but not limited to a digital phone, cellular phone, laptop computer, desktop computer, digital assistant, server or server/client system.

Computer program, software program, program, software or program code in the present context mean any expression, in any language, code or notation, of a set of instructions readable by a processor or computer system, intended to cause a system having an information processing capability to perform a particular function or bring about a certain result either directly or after either or both of the following: (a) conversion to another language, code or notation; and (b) reproduction in a different material form. A computer program can be written in any form of programming language, including compiled or interpreted languages, and it can be deployed in any form, including as a stand-alone program or as a module, component, subroutine, or other unit suitable for use in a computing environment.

Figure 18:
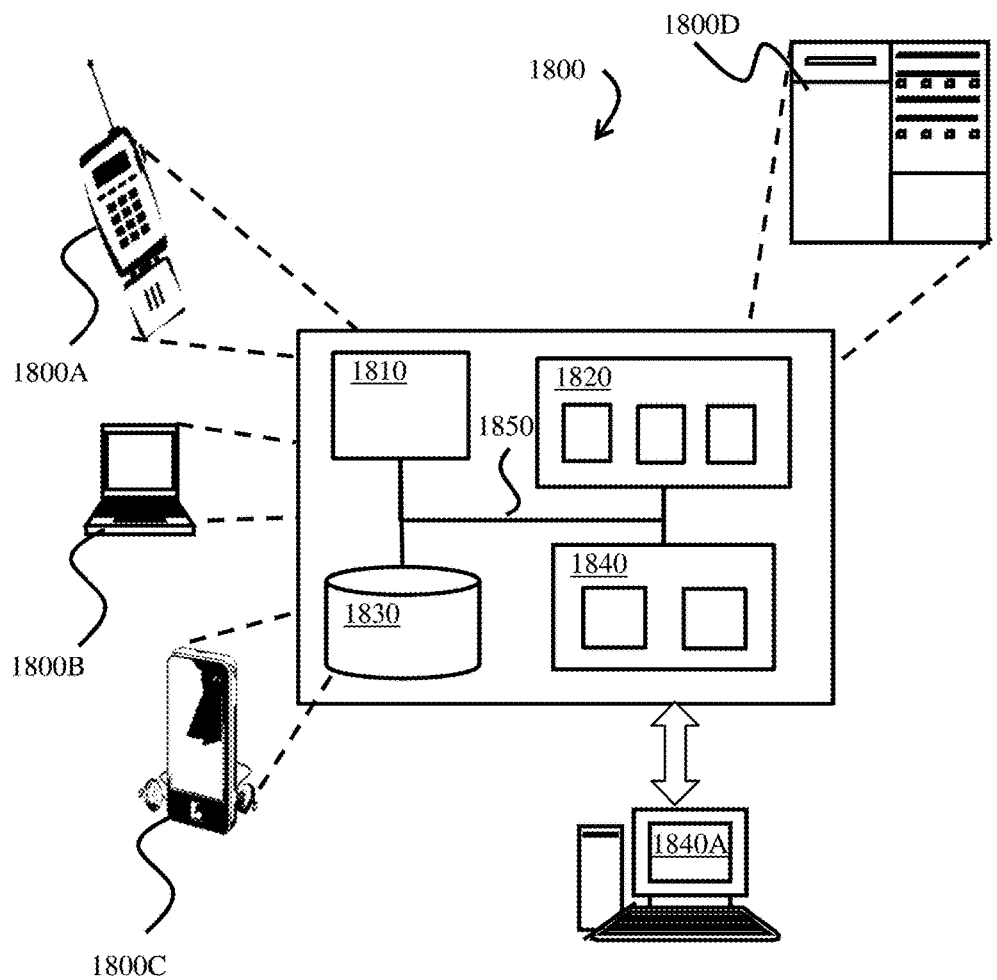
FIG. 18 illustrates one example embodiment of a computer system suitable for a system to customize student instruction.

FIG. 18 is a schematic diagram of one embodiment of a computer system 1800 by which the environmental system reaction methods may be carried out. The computer system 1800 can be used for the operations described in association with any of the computer implemented methods described herein. The computer system 1800 includes at least one processor 1810, a memory 1820 and an input/output device 1840. Each of the components 1810, 1820, and 1840 are operably coupled or interconnected using a system bus 1850. The computer system 1800 may further comprise a storage device 1830 operably coupled or interconnected with the system bus 1850.

Some example embodiments of the computer system 1800 comprises a phone 1800A, a portable computer 1800B, a personal digital assistant 1800C or a server/mainframe 1800D.

The at least one processor 1810 is capable of receiving the instructions and/or data and processing the instructions of a computer program for execution within the computer system 1800. In some embodiments, the processor 1810 is a singlethreaded processor. In some embodiments, the processor 1810 is a multi-threaded processor. The processor 1810 is capable of processing instructions of a computer stored in the memory 1820 or on the storage device 1830 to communicate information to the input/output device 1840. Suitable processors for the execution of the computer program instruction include, by way of example, both general and special purpose microprocessors, and a sole processor or one of multiple processors of any kind of computer.

The memory 1820 stores information within the computer system 1800. Memory 1820 may comprise a magnetic disk such as an internal hard disk or removable disk; a magneto-optical disk; an optical disk; or a semiconductor memory device such as PROM, EPROM, EEPROM or a flash memory device. In some embodiments, the memory 1820 comprises a transitory or non-transitory computer readable medium. In some embodiments, the memory 1820 is a volatile memory unit. In another embodiment, the memory 1820 is a non-volatile memory unit.

The processor 1810 and the memory 1820 can be supplemented by, or incorporated in, ASICs (application-specific integrated circuits).

The storage device 1830 may be capable of providing mass storage for the system 1800. In various embodiments, the storage device 1830 may be, for example only and not for limitation, a computer readable medium such as a floppy disk, a hard disk, an optical disk, a tape device, CD-ROM and DVD-ROM disks, alone or with a device to read the computer readable medium, or any other means known to the skilled artisan for providing the computer program to the computer system for execution thereby. In some embodiments, the storage device 1830 comprises a transitory or non-transitory computer readable medium.

In some embodiments, the memory 1820 and/or the storage device 1830 may be located on a remote system such as a server system, coupled to the processor 1810 via a network interface, such as an Ethernet interface.

The input/output device 1840 provides input/output operations for the system 1800 and may be in communication with a user interface 1840A as shown. In one embodiment, the input/output device 1840 includes a keyboard and/or pointing device. In some embodiments, the input/output device 1840 includes a display unit for displaying graphical user interfaces or the input/output device 1840 may comprise a touchscreen. In some embodiments, the user interface 1840A comprises devices such as, but not limited to a keyboard, pointing device, display device or a touchscreen that provides a user with the ability to communicate with the input/output device 1840.

The computer system 1800 can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, wireless phone networks and the computers and networks forming the Internet.

One example embodiment of the systems and methods to customize student instruction may be embodied in a computer program product, the computer program product comprising a computer readable medium having a computer readable program code tangibly embodied therewith, the computer program code configured to implement the methods described herein, and which, when loaded in a computer system comprising a processor, is able to carry out these methods.

One Embodiment of the System to Customize Student Instruction in Operation:

Given a discovered ontology, an example embodiment used a problem (action) similarity to other problems to predict a student's performance. For example, if a Problem 8a were found, through PCA, to be very similar to a Problem 3b, this embodiment would predict that the student would most likely perform in the same way as they did on Problem 3b. This regression analysis allows us to discover the transition probabilities between student states for the POMDP.

The embodiment further postulated that high performing students are likely to perform differently than low performing students. Each student's performance scores on the first $\frac{1}{6}^{th}$ of their problems were thus used to group the students into classes. There were three classes, Low, Average, and High, that were used to attempt to predict student performance on the last $\frac{5}{6}^{th}$ of the problems they took, based only on the first $\frac{1}{6}^{th}$. The graph in FIG. 16 illustrates how well this method worked for students that were initially labeled in the Average class.

Figure 16:
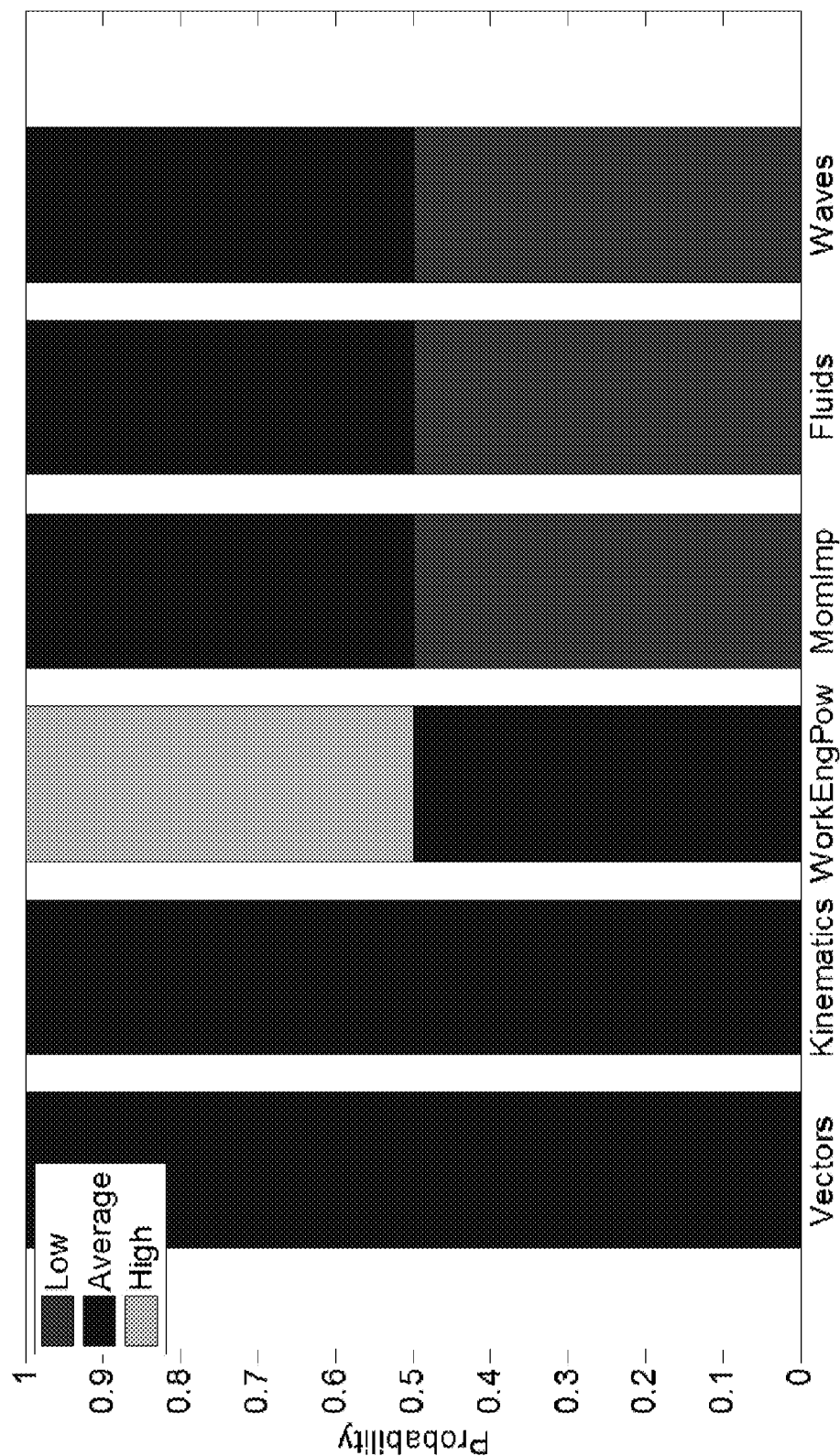
FIG. 16 illustrates transition probabilities given average category rating for vectors.
Figure 17:
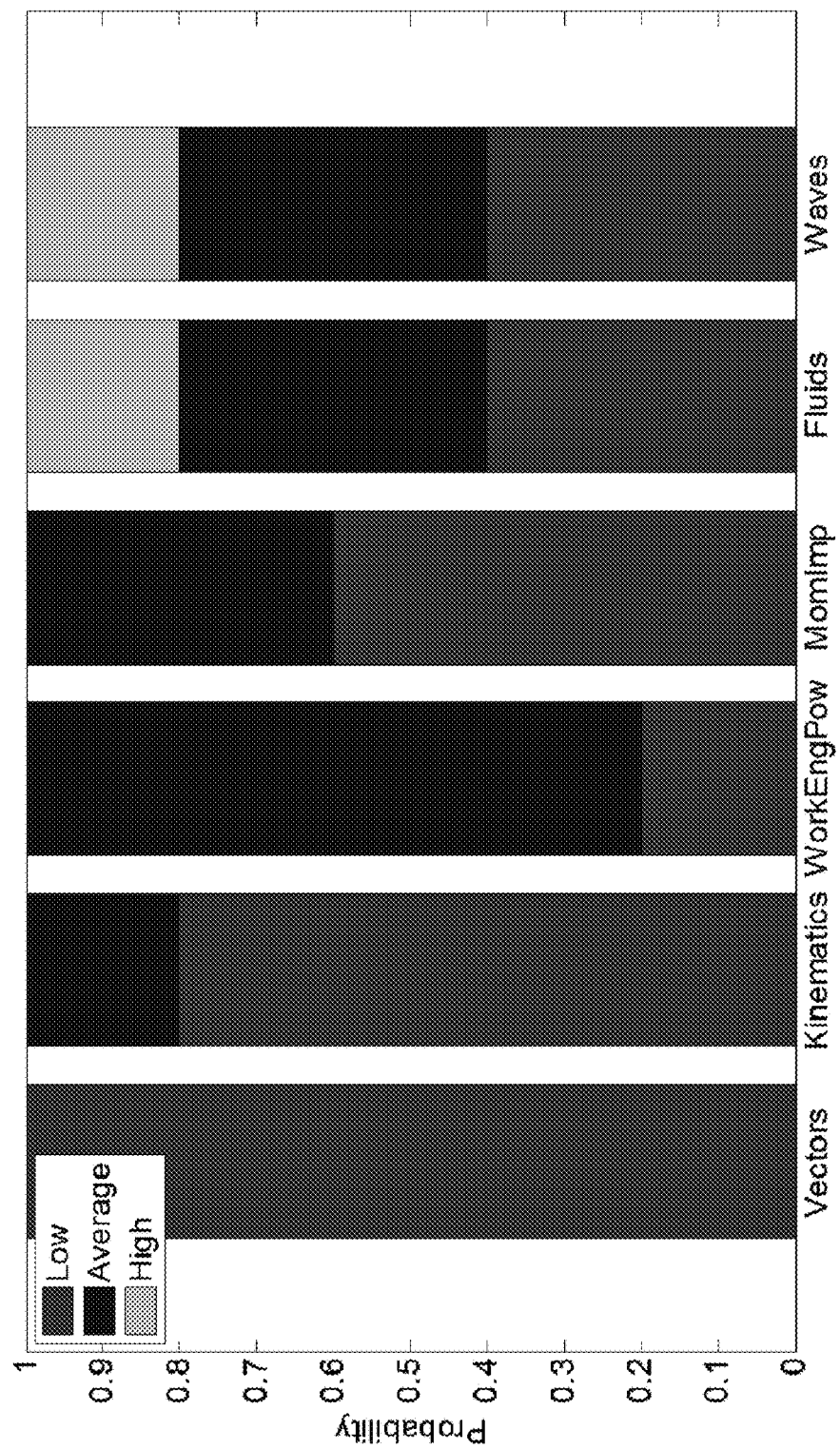
FIG. 17 illustrates transition probabilities given low category rating for vectors.

In FIG. 16, students who were initially in the Average class for the first portion of the problems taken (the Vector problems), are 100% likely to be in the Average class for the next set of problems (Kinematics). As time progresses, the prediction accuracy deteriorates, but for the last four problem types, the students initially labeled in the Average class are still 50% likely to remain in the Average class. Students who were initially classified in the Low class have an 80% chance of remaining in the Low class for Kinematics, and a 60% chance of performing poorly in the Momentum and Impulse set of problems (FIG. 16).

Regression Analysis gives us probabilistic performance predictions, which appear to be most powerful when looking in the near-term. For instance, when attempting to predict performance on the last Vectors problem using previous Vectors problems, Table 2 shows the results. The computed score was using a formula to predict:

$$1 - \frac{\text{hints} + \text{incorrect steps}}{\text{correct steps}}$$

on a vectors homework problem. Typically this formula produced a number between −3 and 1. A regression method is compared to a method of just using the last item of the homework to make the prediction. However, performance degrades when looking further into the future, for instance using performance on Vectors to predict performance on Waves. We anticipate that this embodiment will be able to use the most recent classification of a student to make a more accurate prediction of that student's performance in the immediate future, although this embodiment could use the less accurate predictions when data was unavailable.

TABLE 2

Regression results for the vectors competency

| Mean Error Regression | Mean Error Last Item |
|---|---|
| .045 | .866 |

We parameterized the observation model, assuming items with $\theta$ and $\beta$ parameters such that a student at a high level of proficiency has an 80% chance of getting an item correct, and a student at a low level has a 20% chance.

An instructional policy was automatically generated. We will call this machine-generated policy the "instructor" in this section. This policy chooses a remediation for the student on the current topic (Vectors, Kinematics, etc.), based on its assessment of student progress. Three remediations are possible, one for students who are currently at a high proficiency, one for medium, and one for low. However, the true state of the student is hidden from the instructor, so the instructor must infer the best possible remediation based on its observations of the student.

Four instructional strategies were tried:

Myopic: The intervention is based on the success or failure of the last item.

Measurement Only: The intervention is based on the history of measurements, but the instructional computation does not take into account the transition dynamics.

Learning Path Only: The intervention is based on the transition dynamics, but does not account for measurements.

Combined: The intervention is based on combining information produced by Markov chains and IRT.

Each of these strategies includes components of the embodiment. The Measurement only condition uses the products of IRT, but not the Markov chains. Conversely, the Learning Path Only uses information from the Markov chain but contains no direct measurement. The combined strategy includes all elements of the embodiment.

The model was run on 10,000 simulated students performing the Vectors portion of the Andes curriculum. An intervention was deemed incorrect if it was targeted at a student in a high state of comprehension when the student was actually in a low state, and vice versa. If the intervention was intermediate and the student was in a low or high state, the intervention was scored as 30% correct. Likewise, if the student was in an intermediate state and the intervention targeted a low or high student, the intervention was scored as 30% correct. Table 3 shows the results.

TABLE 3

Scoring results for intervention strategies

| Instructional Strategy | Percent of interventions correct |
|---|---|
| Myopic | 48.1% |
| Measurement Only | 62.5% |
| Learning Path | 74.3% |
| Combined | 76.5% |

As expected, the myopic intervention performed the poorest, scoring only 48.1% correct (a random guess would do nearly as well). A single measurement was not very effective by itself. In this experiment, the learning path condition outperformed the Measurement only condition. Thus, in this experiment, knowledge of the learning path was more important than the individual measures. Finally, as expected, the Combined approach, which uses both knowledge about the learning path and knowledge of the individual measures, outperformed all of the other approaches.

Table 4 shows results for an alternative scoring system. In this scoring system, we only gave credit when an intervention was exactly the correct one. That is, we eliminated the 30% correctness for an intervention that was "almost correct", as specified in the description of the previous table (thus, given three interventions and three student states, random chance would produce a 33% correct rate). Results were similar, in that the Combined strategy outperformed the other instructional strategies.

TABLE 4

Results for intervention strategies applying alternative scoring system

| Instructional Strategy | Percent of interventions correct |
|---|---|
| Myopic | 29.8% |
| Measurement Only | 48.2% |
| Learning Path | 62.5% |
| Combined | 66.9% |

Thus far, we have shown above results in which the Learning Path strategy outperforms the Measurement only strategy and the Combined strategy barely outperforms the Learning Path strategy. That is, in the above situation, most of the information is gained by knowledge of the learning path. However, we believe that this is domain specific to our Andes results, and may not be generally true. To illustrate, we generated an artificial learning path and observation matrix. In this artificial data, the learning path is very noisy and inconclusive (a student is 50% likely to stay in the same knowledge state, otherwise, the student randomly transitions to one of the other states). On the other hand, we changed the measurement model in this artificial set so that the measurements are more precise. Table 5 features the results of our hypothetical study.

TABLE 5

Scoring results for artificial dataset

| Instructional Strategy | Percent of interventions correct |
|---|---|
| Myopic | 62.1% |
| Measurement Only | 68.6% |
| Learning Path | 32.2% |
| Combined | 69.8% |

In this artificial model, most of the information came in the individual measurements and not through knowledge of the learning path. Thus, whether the primary benefit to remediation occurs because of measurement or because of knowledge of the learning path may depend on the domain.

In summary, a combined Measurement and Learning Path approach outperformed either approach alone in our computational study. How much it outperforms each approach, and how well the approach does in general, may be dependent on the particulars of the domain and the precision at which the Measurement and Learning Path computations can identify the strengths and weaknesses of the student.

One advantage of using the present solution is that it provides a fully automated way to create and update a model of an educational domain, together with an automated way to estimate and score concept difficulty, that can directly be used for the optimal delivery of training and educational materials. Other methods such as conventional Intelligent Tutoring Systems are either labor-intensive, have no provision for optimal training delivery, or both.

Although this invention has been described in the above forms with a certain degree of particularity, it is understood that the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention which is defined in the claims and their equivalents.

We claim:

1. A computer implemented method for determining an action for a user within a learning domain, the method comprising:
   defining an initial learning model of a learning domain comprising:
   a plurality of learning domain states,
   at least one learning domain action,
   at least one domain learning domain state transition,
   and at least one learning domain observation;
   determining an initial user state of the user;
   the initial user state comprising one of the plurality of learning domain states;
   determining an initial user action from the at least one learning domain action with the initial learning model given the initial user state as the one of the plurality of learning domain states;
   receiving a user observation of the user after the user executes the initial user action;
   the user observation comprising one of the at least one learning domain observations;
   determining, with a processor, an updated user state from the plurality of learning domain states with the initial learning model given the user observation; and
   determining a subsequent user action from the at least one learning domain action.

2. The computer implemented method of claim 1 wherein:
   the initial learning model comprises a Partially Observable Markov Decision Process (POMDP); and
   the at least one domain learning domain state transition comprises a learning domain state transition probability table of $P(s'|s, a)$ where s is the initial user state, s' is the updated user state and a is the at least one learning domain action.

3. The computer implemented method of claim 2 further comprising automatically determining the learning domain state transition probability table utilizing a Hidden Markov Model (HMM) function where an input to the HMM function comprises a probability that the initial user state will change to the updated user state, a probability that the learning domain observation is obtained while a user state of the user is the updated user state and a probability of the initial user state.

4. The computer implemented method of claim 3 wherein the HMM function comprises a state transition probability distribution, a conditional observation probability distribution, and a probability of the initial user state whereby the state transition probability distribution defines the at least one domain learning domain state transition for the POMDP given the at least one learning domain observation defined by the conditional observation probability distribution for the initial user state defined by the probability of the initial user state.

5. The computer implemented method of claim 1 further comprising defining the plurality of learning domain states, the at least one learning domain action and the at least one learning domain observation from a learning domain ontology.

6. The computer implemented method of claim 5 wherein:
   defining an initial learning model of a learning domain further comprises automatically determining the learning domain ontology from a learning domain data set comprising a plurality of learning domain problems and a plurality of learning domain observations; and
   the plurality of learning domain problems comprise a plurality of experiential learning modules presented to the user by a computer based adaptive trainer.

7. The computer implemented method of claim 6 wherein:
   automatically determining the learning domain ontology from a learning domain data set further comprises utilizing a Principal Component Analysis (PCA) algorithm whereby an input is the plurality of learning domain problems and the plurality of learning domain observations and an output is at least one of the plurality of learning domain states.

8. The computer implemented method of claim 7 wherein:
   the initial learning model comprises a Partially Observable Markov Decision Process (POMDP); and
   the at least one of the plurality of learning domain states defines the plurality of learning domain states for the POMDP.

9. The computer implemented method of claim 1 wherein:
   the plurality of learning domain states comprises a competency measure; and
   defining the initial learning model of a learning domain further comprises automatically determining the competency measure.

10. The computer implemented method of claim 9 wherein defining the initial learning model of a learning domain further comprises automatically determining the competency measure further comprises utilizing an Item Response Theory (IRT) algorithm comprising a conditional probability of getting at least one item correct given a latent proficiency score of the user and a difficulty level of the at least one item.

11. The computer implemented method of claim 10 wherein:
   the initial learning model comprises a Partially Observable Markov Decision Process (POMDP); and
   a conditional probability of getting the at least one item correct given a latent proficiency score of the user and a difficulty level of the at least one item defines the at least one learning domain observation for the POMDP.

12. The computer implemented method of claim 3 wherein:
   automatically determining a learning domain ontology from a learning domain data set further comprises utilizing a Principal Component Analysis (PCA) algorithm whereby the input is a plurality of learning domain problems and a plurality of learning domain observations and an output is at least one of the plurality of learning domain states;
   the plurality of learning domain states defines the plurality of learning domain states for the POMDP;
   defining the initial learning model of a learning domain further comprises automatically determining a competency measure utilizing an Item Response Theory (IRT) algorithm comprising a conditional probability of getting at least one item correct given a latent proficiency score of the user and a difficulty level of the at least one item; and
   the a conditional probability of getting the at least one item correct given a latent proficiency score of the user and a difficulty level of the at least one item defines the at least one learning domain observation for the POMDP.

13. A learning model system for determining an action for a user within a learning domain, the learning model system comprising a computer system including one or multiple processors configured to perform the functions of:
defining an initial learning model of a learning domain comprising:
a plurality of learning domain states,
at least one learning domain action,
at least one domain learning domain state transition,
and at least one learning domain observation;
determining an initial user state of the user;
the initial user state comprising one of the plurality of learning domain states;
determining an initial user action from the at least one learning domain action with the initial learning model given the initial user state as the one of the plurality of learning domain states;
receiving a user observation of the user after the user executes the initial user action;
the user observation comprising one of the at least one learning domain observations;
determining, with a processor, an updated user state from one of the plurality of learning domain states with the initial learning model given the user observation; and
determining a subsequent user action from the at least one learning domain action.

14. The learning model system of claim 13 wherein:
the initial learning model comprises a Partially Observable Markov Decision Process (POMDP); and
the at least one domain learning domain state transition comprises a learning domain state transition probability table of P (s'|s, a) where s is the initial user state, s' is the updated user state and a is the at least one learning domain action.

15. The learning model system of claim 14 wherein the one or more processors are further configured to perform the functions of automatically determining the learning domain state transition probability table utilizing a Hidden Markov Model (HMM) function where an input to the HMM function comprises a probability that the initial user state will change to the updated user state, a probability that the learning domain observation is obtained while a user state of the user is the updated user state and a probability of the initial user state.

16. The learning model system of claim 13 wherein:
the initial learning model comprises a Partially Observable Markov Decision Process (POMDP);
the one or more processors are further configured to perform the functions of:
automatically determining a learning domain ontology from a learning domain data set utilizing a Principal Component Analysis (PCA) algorithm whereby an input is a plurality of learning domain problems and a plurality of learning domain observations and an output is at least one of the plurality of learning domain states; and
the plurality of learning domain states defines the plurality of learning domain states for the POMDP.

17. The learning model system of claim 13 wherein:
the plurality of learning domain states comprises a competency measure;
the one or more processors are further configured to perform the functions of:
defining the initial learning model of a learning domain further comprises automatically determining the competency measure utilizing an Item Response Theory (IRT) algorithm comprising a conditional probability of getting at least one item correct given a latent proficiency score of the user and a difficulty level of the at least one item;
the initial learning model comprises a Partially Observable Markov Decision Process (POMDP); and
the conditional probability of getting the at least one item correct given a latent proficiency score of the user and a difficulty level of the at least one item defines the at least one learning domain observation for the POMDP.

18. A computer program product for a learning model system comprising a non-transitory computer readable storage medium having a computer readable program code embodied therein, said computer readable program code configured to be executed to implement a method determining an action for a user within a learning domain, comprising:
defining an initial learning model of a learning domain comprising:
a plurality of learning domain states,
at least one learning domain action,
at least one domain learning domain state transition,
and at least one learning domain observation;
determining an initial user state of the user;
the initial user state comprising one of the plurality of learning domain states;
the plurality of learning domain states comprise a competency measure;
determining an initial user action from the at least one learning domain action with the initial learning model given the initial user state as the one of the plurality of learning domain states;
receiving a user observation of the user after the user executes the initial user action;
the user observation comprising one of the at least one learning domain observations;
determining, with a processor, an updated user state from one of the plurality of learning domain states with the initial learning model given the user observation; and
determining a subsequent user action from the at least one learning domain action.

19. The computer implemented method of claim 1 wherein:
the initial user action comprises at least one of a test, a quiz or a problem; and
the at least one learning domain observation comprises a user's score on the test, the quiz or the problem.

20. The computer implemented method of claim 1 wherein:
the at least one learning domain action comprises at least one initial learning module;
the initial user action comprises presenting the initial learning module to the user; and
the at least one learning domain observation comprises a physiological measure of the user when the user executes the initial user action.

21. The learning model system of claim 13 wherein:
the learning model system is a computer based adaptive trainer;
the user is a student communicating with the computer based adaptive trainer;
the plurality of learning domain states comprise a plurality of competency measures to define at least the initial user state and the updated user state of the user;
the at least one learning domain action comprises at least one learning module presented to the user by the computer based adaptive trainer;
the at least one domain learning domain state transition comprises a learning domain state transition probability table of P (s'|s, a) where s is the initial user state, s' is the updated user state and a is the at least one learning domain action;

the at least one learning domain observation is an observation of a performance of the user on the learning module presented to the user; and the subsequent user action from the at least one learning domain action comprises a learning domain action determined specifically for the user based on the updated user state.

* * * * *